(12) United States Patent
Liu et al.

(10) Patent No.: US 11,719,091 B2
(45) Date of Patent: *Aug. 8, 2023

(54) ESTIMATING NATURAL FRACTURE PROPERTIES BASED ON PRODUCTION FROM HYDRAULICALLY FRACTURED WELLS

(71) Applicant: Saudi Arabian Oil Company, Dhahran (SA)

(72) Inventors: Chao Liu, Brookshire, TX (US); Younane N. Abousleiman, Norman, OK (US)

(73) Assignee: Saudi Arabian Oil Company, Dhahran (SA)

( * ) Notice: Subject to any disclaimer, the term of this patent is extended or adjusted under 35 U.S.C. 154(b) by 23 days.

This patent is subject to a terminal disclaimer.

(21) Appl. No.: 17/550,832

(22) Filed: Dec. 14, 2021

(65) Prior Publication Data
US 2022/0106868 A1    Apr. 7, 2022

Related U.S. Application Data

(63) Continuation of application No. 16/746,016, filed on Jan. 17, 2020, now Pat. No. 11,268,373.

(51) Int. Cl.
*E21B 47/06*    (2012.01)
*E21B 47/07*    (2012.01)
(Continued)

(52) U.S. Cl.
CPC ............... *E21B 47/06* (2013.01); *E21B 47/07* (2020.05); *E21B 49/00* (2013.01); *E21B 49/08* (2013.01); *G01V 9/00* (2013.01); *E21B 49/0875* (2020.05)

(58) Field of Classification Search
CPC .......... E21B 47/06; E21B 47/07; E21B 49/00; E21B 49/08; E21B 49/008; E21B 2200/20; G01V 9/00; G01V 9/0875
See application file for complete search history.

(56) References Cited

U.S. PATENT DOCUMENTS

| | | | |
|---|---|---|---|
| 830,437 | A | 9/1906 | Humphrey |
| 2,900,269 | A | 8/1959 | Bauman et al. |

(Continued)

FOREIGN PATENT DOCUMENTS

| | | |
|---|---|---|
| CA | 2322118 | 12/2007 |
| CN | 101819111 | 12/2011 |

(Continued)

OTHER PUBLICATIONS

Al-Rbeawi, S., Analysis of Pressure Behavior and Flow Regimes of Naturally and Hydraulically Fractured Unconventional Gas Reservoirs Using Multi-Linear Flow Regimes Approach, 2017, Journal of Natural Gas Science and Engineering 45, pp. 637-658 (Year: 2017).*

(Continued)

*Primary Examiner* — Toan M Le
(74) *Attorney, Agent, or Firm* — Fish & Richardson P.C.

(57) ABSTRACT

To estimate natural fracture properties based on production from hydraulically fractured wells, a computer system receives hydrocarbon reservoir production information associated with a naturally fractured hydrocarbon reservoir with entrapped hydrocarbons in which a wellbore has been formed to produce the hydrocarbons. The information includes a wellbore pressure measured over production time. From the wellbore pressure, the computer system determines a time rate of change of the wellbore pressure over the production time. From a plot of a logarithmic time rate of change of the wellbore pressure over logarithmic production time, the computer system identifies multiple plot sections, (Continued)

each representing a respective flow regime of a flow of the hydrocarbons from the reservoir. For each plot section, the computer system determines a corresponding time rate of change of the wellbore pressure intersect value and a reservoir parameter for each corresponding time rate of change of the wellbore pressure intersect value determined for each plot section.

22 Claims, 5 Drawing Sheets

(51) Int. Cl.
    *E21B 49/00*     (2006.01)
    *E21B 49/08*     (2006.01)
    *G01V 9/00*     (2006.01)

(56) References Cited

U.S. PATENT DOCUMENTS

| | | |
|---|---|---|
| 3,284,281 A | 11/1966 | Thomas |
| 3,316,965 A | 5/1967 | Watanabe |
| 3,716,387 A | 2/1973 | Simmons et al. |
| 3,807,557 A | 4/1974 | Miller |
| 3,926,575 A | 12/1975 | Meyers |
| 3,977,472 A | 8/1976 | Graham et al. |
| 3,996,062 A | 12/1976 | Frost |
| 4,043,885 A | 8/1977 | Yen et al. |
| 4,047,988 A | 9/1977 | Weill |
| 4,195,010 A | 3/1980 | Russell et al. |
| 4,220,550 A | 9/1980 | Frenier et al. |
| 4,223,726 A | 9/1980 | Cha |
| 4,252,189 A | 2/1981 | Bodine |
| 4,289,639 A | 9/1981 | Buske |
| 4,324,560 A | 4/1982 | Fonseca |
| 4,381,950 A | 5/1983 | Lawson |
| 4,444,058 A | 4/1984 | Ratigan |
| 4,480,696 A | 11/1984 | Almond et al. |
| 4,493,875 A | 1/1985 | Beck et al. |
| 4,587,739 A | 5/1986 | Holcomb |
| 4,594,170 A | 6/1986 | Brown et al. |
| 4,640,692 A | 2/1987 | Audeh |
| 4,681,914 A | 7/1987 | Olson et al. |
| 4,708,805 A | 11/1987 | D'Muhala |
| 4,718,489 A | 1/1988 | Hallam et al. |
| 4,780,223 A | 10/1988 | Baranet et al. |
| 4,830,773 A | 5/1989 | Olson |
| 4,830,779 A | 5/1989 | Maeno et al. |
| 4,864,472 A | 9/1989 | Yoshimura |
| 4,887,670 A | 12/1989 | Lord et al. |
| 5,193,396 A | 3/1993 | Gorski |
| 5,213,705 A | 5/1993 | Olson |
| 5,302,297 A | 4/1994 | Barthrope |
| 5,435,187 A | 7/1995 | Ewy |
| 5,757,473 A | 5/1998 | Kanduth et al. |
| 5,759,964 A | 6/1998 | Shuchart |
| 5,869,750 A | 2/1999 | Onan |
| 5,999,887 A | 12/1999 | Giannakopoulos et al. |
| 6,076,046 A | 6/2000 | Vasudevan et al. |
| 6,095,679 A | 8/2000 | Hammiche et al. |
| 6,138,760 A | 10/2000 | Lopez et al. |
| 6,165,295 A | 12/2000 | Wagaman |
| 6,227,295 B1 | 5/2001 | Mitchell et al. |
| 6,349,595 B1 | 2/2002 | Lorenzo et al. |
| 6,411,902 B1 | 6/2002 | Wiltshire |
| 6,488,091 B1 | 12/2002 | Weaver |
| 6,491,425 B1 | 12/2002 | Hammiche et al. |
| 6,494,263 B2 | 12/2002 | Todd |
| 6,516,080 B1 | 2/2003 | Nur |
| 6,579,572 B2 | 6/2003 | Espin et al. |
| 6,652,682 B1 | 11/2003 | Fawls |
| 6,705,398 B2 | 3/2004 | Weng |
| 6,729,409 B1 | 5/2004 | Gupta et al. |
| 6,749,022 B1 | 6/2004 | Fredd |
| 6,776,235 B1 | 8/2004 | England |
| 6,832,158 B2 | 12/2004 | Mese |
| 6,846,420 B2 | 1/2005 | Reddy et al. |
| 6,866,048 B2 | 3/2005 | Mattox |
| 6,884,760 B1 | 4/2005 | Brand et al. |
| 6,947,843 B2 | 9/2005 | Fisher et al. |
| 6,989,391 B2 | 1/2006 | Funkhouser |
| 7,086,484 B2 | 8/2006 | Smith |
| 7,098,663 B1 | 8/2006 | Bader |
| 7,210,528 B1 | 5/2007 | Brannon et al. |
| 7,255,169 B2 | 8/2007 | van Batenburg et al. |
| 7,261,158 B2 | 8/2007 | Middaugh et al. |
| 7,281,580 B2 | 10/2007 | Parker et al. |
| 7,281,581 B2 | 10/2007 | Nyuyen et al. |
| 7,326,670 B2 | 2/2008 | DiLullo et al. |
| 7,334,635 B2 | 2/2008 | Nguyen |
| 7,334,636 B2 | 2/2008 | Nguyen |
| 7,344,889 B2 | 3/2008 | Kelemen et al. |
| 7,369,980 B2 | 5/2008 | Deffenbaugh et al. |
| 7,424,911 B2 | 9/2008 | McCarthy et al. |
| 7,451,812 B2 | 11/2008 | Cooper et al. |
| 7,472,751 B2 | 1/2009 | Brannon et al. |
| 7,500,517 B2 | 3/2009 | Looney et al. |
| 7,526,418 B2 | 4/2009 | Pita et al. |
| 7,527,097 B2 | 5/2009 | Patel |
| 7,565,831 B2 | 7/2009 | Miyahara |
| 7,571,767 B2 | 8/2009 | Parker et al. |
| 7,581,590 B2 | 9/2009 | Lesko et al. |
| 7,588,085 B2 | 9/2009 | Acock et al. |
| 7,621,173 B2 | 11/2009 | Hsu |
| 7,645,883 B1 | 1/2010 | Hawkins et al. |
| 7,654,159 B2 | 2/2010 | Enoksson |
| 7,703,531 B2 | 4/2010 | Huang |
| 7,771,549 B1 | 8/2010 | Christe et al. |
| 7,789,164 B2 | 9/2010 | Looney et al. |
| 7,803,740 B2 | 9/2010 | Bicerano et al. |
| 7,857,055 B2 | 12/2010 | Li |
| 7,918,277 B2 | 4/2011 | Brannon et al. |
| 7,921,911 B2 | 4/2011 | Fuller et al. |
| 7,983,845 B2 | 7/2011 | Minh |
| 8,003,212 B2 | 8/2011 | Smith et al. |
| 8,003,577 B2 | 8/2011 | Li et al. |
| 8,006,760 B2 | 8/2011 | Fleming et al. |
| 8,066,068 B2 | 11/2011 | Lesko et al. |
| 8,104,536 B2 | 1/2012 | Looney et al. |
| 8,119,576 B2 | 2/2012 | Reyes et al. |
| 8,127,850 B2 | 3/2012 | Brannon et al. |
| 8,146,416 B2 | 4/2012 | Pisio et al. |
| 8,165,817 B2 | 4/2012 | Betancourt et al. |
| 8,177,422 B2 | 5/2012 | Kjoller et al. |
| 8,205,675 B2 | 6/2012 | Brannon et al. |
| 8,225,866 B2 | 7/2012 | Rouffignac et al. |
| 8,278,931 B2 | 10/2012 | Fang et al. |
| 8,352,228 B2 | 1/2013 | Walters et al. |
| 8,380,437 B2 | 2/2013 | Abousleiman et al. |
| 8,408,305 B2 | 4/2013 | Brannon et al. |
| 8,473,213 B2 | 6/2013 | Zhu et al. |
| 8,490,700 B2 | 7/2013 | Lesko et al. |
| 8,636,065 B2 | 1/2014 | Lesko et al. |
| 8,701,788 B2 | 4/2014 | Wigand et al. |
| 8,729,903 B2 | 5/2014 | Srnka et al. |
| 8,757,259 B2 | 6/2014 | Lesko et al. |
| 8,763,699 B2 | 7/2014 | Medvedev et al. |
| 8,763,703 B2 | 7/2014 | Saini et al. |
| 8,796,187 B2 | 8/2014 | Reyes et al. |
| 8,822,386 B2 | 9/2014 | Quintero et al. |
| 8,835,363 B2 | 9/2014 | Amanullah et al. |
| 8,839,860 B2 | 9/2014 | Wigand et al. |
| 8,844,366 B2 | 9/2014 | Warren |
| 8,851,177 B2 | 10/2014 | Wigand |
| 8,865,482 B2 | 10/2014 | Wang et al. |
| 8,868,385 B2 | 10/2014 | Fertig et al. |
| 8,936,083 B2 | 1/2015 | Nguyen |
| 8,936,089 B2 | 1/2015 | Wigand |
| 9,006,151 B2 | 4/2015 | Amanullah et al. |
| 9,006,153 B2 | 4/2015 | Lin et al. |
| 9,033,043 B2 | 5/2015 | Hinkel |
| 9,057,797 B2 | 6/2015 | Omeragic et al. |
| 9,080,440 B2 | 7/2015 | Panga et al. |

(56) References Cited

U.S. PATENT DOCUMENTS

| | | |
|---|---|---|
| 9,085,727 B2 | 7/2015 | Litvinets et al. |
| 9,128,210 B2 | 9/2015 | Pomerantz |
| 9,133,398 B2 | 9/2015 | Wigand et al. |
| 9,152,745 B2 | 10/2015 | Glinsky |
| 9,297,244 B2 | 3/2016 | Mahoney et al. |
| 9,523,268 B2 | 12/2016 | Potapenko et al. |
| 9,664,018 B2 | 5/2017 | Vandeponseele et al. |
| 9,670,764 B2 | 6/2017 | Lesko et al. |
| 9,688,904 B2 | 6/2017 | Wang et al. |
| 9,696,270 B1 | 7/2017 | Roy et al. |
| 9,725,645 B2 | 8/2017 | Monastiriotis et al. |
| 9,753,016 B1 | 9/2017 | Daugela |
| 9,784,882 B2 | 10/2017 | Vinegar et al. |
| 9,816,365 B2 | 11/2017 | Nguyen et al. |
| 9,834,721 B2 | 12/2017 | Chang et al. |
| 9,863,211 B2 | 1/2018 | Gamage et al. |
| 9,863,230 B2 | 1/2018 | Litvinets et al. |
| 9,863,231 B2 | 1/2018 | Hull et al. |
| 9,869,649 B2 | 1/2018 | Hull et al. |
| 9,885,691 B1 | 2/2018 | Daugela |
| 9,895,670 B2 | 2/2018 | Anders et al. |
| 9,902,898 B2 | 2/2018 | Nelson et al. |
| 9,909,404 B2 | 3/2018 | Hwang et al. |
| 9,927,344 B2 | 3/2018 | Chertov |
| 9,995,125 B2 | 6/2018 | Madasu et al. |
| 9,995,220 B2 | 6/2018 | Hawie et al. |
| 10,001,769 B2 | 6/2018 | Huang et al. |
| 10,030,495 B2 | 7/2018 | Litvinets et al. |
| 10,047,281 B2 | 8/2018 | Nguyen et al. |
| 10,066,149 B2 | 9/2018 | Li et al. |
| 10,077,396 B2 | 9/2018 | Nguyen et al. |
| 10,113,396 B2 | 10/2018 | Nelson et al. |
| 10,151,715 B2 | 12/2018 | Hull et al. |
| 10,273,398 B2 | 4/2019 | Liu et al. |
| 10,329,478 B2 | 6/2019 | Schnoor et al. |
| 10,351,758 B2 | 7/2019 | Hull et al. |
| 10,379,068 B2 | 8/2019 | Hull et al. |
| 11,268,373 B2 * | 3/2022 | Liu .................. E21B 49/008 |
| 2003/0209248 A1 | 11/2003 | Ward |
| 2003/0212465 A1 | 11/2003 | Howard et al. |
| 2004/0211567 A1 | 10/2004 | Aud |
| 2005/0060130 A1 | 3/2005 | Shapiro et al. |
| 2005/0103118 A1 | 5/2005 | Workman |
| 2005/0274523 A1 | 12/2005 | Brannon et al. |
| 2006/0047489 A1 | 3/2006 | Scheidt et al. |
| 2006/0092766 A1 | 5/2006 | Shelley et al. |
| 2006/0265204 A1 | 11/2006 | Wallis et al. |
| 2007/0054054 A1 | 3/2007 | Svoboda et al. |
| 2007/0087940 A1 | 4/2007 | Qu et al. |
| 2007/0203677 A1 | 8/2007 | Awwiller |
| 2007/0235181 A1 | 10/2007 | Lecampion et al. |
| 2007/0298979 A1 | 12/2007 | Perry et al. |
| 2008/0006410 A1 | 1/2008 | Looney et al. |
| 2008/0059140 A1 | 3/2008 | Salmon et al. |
| 2008/0070806 A1 | 3/2008 | Lin et al. |
| 2008/0081771 A1 | 4/2008 | Lin et al. |
| 2008/0093073 A1 | 4/2008 | Bustos et al. |
| 2008/0234147 A1 | 9/2008 | Li et al. |
| 2009/0071239 A1 | 3/2009 | Rojas et al. |
| 2009/0087912 A1 | 4/2009 | Ramos et al. |
| 2009/0143252 A1 | 6/2009 | Lehmann |
| 2009/0193881 A1 | 8/2009 | Finnberg |
| 2009/0242196 A1 | 10/2009 | Pao |
| 2009/0248309 A1 | 10/2009 | Nelville et al. |
| 2009/0253595 A1 | 10/2009 | Qu |
| 2009/0283257 A1 | 11/2009 | Becker |
| 2009/0313772 A1 | 12/2009 | Talley |
| 2010/0010106 A1 | 1/2010 | Crews |
| 2010/0049625 A1 | 2/2010 | Biebesheimer et al. |
| 2010/0051511 A1 | 3/2010 | Faerman |
| 2010/0121623 A1 | 5/2010 | Yogeswaren |
| 2010/0128982 A1 | 5/2010 | Dvorkin et al. |
| 2010/0186520 A1 | 7/2010 | Wheeler |
| 2010/0213579 A1 | 8/2010 | Henry |
| 2010/0224365 A1 | 9/2010 | Abad |
| 2010/0243242 A1 | 9/2010 | Boney et al. |
| 2010/0258265 A1 | 10/2010 | Karanikas et al. |
| 2010/0263867 A1 | 10/2010 | Horton et al. |
| 2010/0276142 A1 | 11/2010 | Skildum et al. |
| 2010/0279136 A1 | 11/2010 | Bonucci |
| 2011/0065612 A1 | 3/2011 | Stokes et al. |
| 2011/0257944 A1 | 10/2011 | Du et al. |
| 2011/0259588 A1 | 10/2011 | Ali |
| 2012/0018159 A1 | 1/2012 | Gulta et al. |
| 2012/0026037 A1 | 2/2012 | Thomson et al. |
| 2012/0129737 A1 | 5/2012 | Lesko et al. |
| 2012/0179444 A1 | 7/2012 | Ganguly et al. |
| 2012/0193578 A1 | 8/2012 | Pan et al. |
| 2012/0247774 A1 | 10/2012 | Li et al. |
| 2012/0261129 A1 | 10/2012 | Becker |
| 2012/0261617 A1 | 10/2012 | Pan et al. |
| 2012/0267102 A1 | 10/2012 | Huang et al. |
| 2012/0318498 A1 | 12/2012 | Parsche |
| 2013/0013209 A1 | 1/2013 | Zhu et al. |
| 2013/0056213 A1 | 3/2013 | Medvedev et al. |
| 2013/0084643 A1 | 4/2013 | Commarieu et al. |
| 2013/0137610 A1 | 5/2013 | Huang |
| 2013/0160994 A1 | 6/2013 | Alsop et al. |
| 2013/0161002 A1 | 6/2013 | Wigand |
| 2013/0213120 A1 | 8/2013 | Lebedev |
| 2013/0213638 A1 | 8/2013 | Keller |
| 2013/0228019 A1 | 9/2013 | Meadows |
| 2013/0231908 A1 | 9/2013 | Williams et al. |
| 2013/0233536 A1 | 9/2013 | Alqam |
| 2013/0238304 A1 | 9/2013 | Glinsky |
| 2013/0269933 A1 | 10/2013 | Pomerantz et al. |
| 2013/0275099 A1 | 10/2013 | Frydman |
| 2014/0008305 A1 | 1/2014 | Nichols et al. |
| 2014/0027109 A1 | 1/2014 | Al-Baraik |
| 2014/0045732 A1 | 2/2014 | Mazyar |
| 2014/0048694 A1 | 2/2014 | Pomerantz |
| 2014/0083687 A1* | 3/2014 | Poe .................. E21B 49/00 |
| | | 166/250.1 |
| 2014/0090850 A1 | 4/2014 | Benicewicz |
| 2014/0096964 A1 | 4/2014 | Chakraborty et al. |
| 2014/0116710 A1 | 5/2014 | Naser-El-Din et al. |
| 2014/0221257 A1 | 8/2014 | Roddy |
| 2014/0231077 A1 | 8/2014 | Rivero et al. |
| 2014/0243246 A1 | 8/2014 | Hendrickson |
| 2014/0247997 A1 | 9/2014 | Nishyama |
| 2014/0251605 A1 | 9/2014 | Hera |
| 2014/0260694 A1 | 9/2014 | Szlendak |
| 2014/0364343 A1 | 12/2014 | Nelson et al. |
| 2014/0367100 A1 | 12/2014 | Oliveria et al. |
| 2014/0374104 A1 | 12/2014 | Kushal |
| 2015/0019183 A1 | 1/2015 | Suzuki |
| 2015/0055438 A1 | 2/2015 | Yan et al. |
| 2015/0057097 A1 | 2/2015 | Cho |
| 2015/0057196 A1 | 2/2015 | Debord |
| 2015/0065398 A1 | 3/2015 | Gartland et al. |
| 2015/0075782 A1 | 3/2015 | Sharma |
| 2015/0083405 A1 | 3/2015 | Dobroskok |
| 2015/0152724 A1 | 6/2015 | Amendt |
| 2015/0167440 A1 | 6/2015 | Kasevich |
| 2015/0192005 A1 | 7/2015 | Saeedfar |
| 2015/0259593 A1 | 9/2015 | Kaufman et al. |
| 2015/0284625 A1 | 10/2015 | Silveira |
| 2015/0293256 A1 | 10/2015 | Dusterhoft |
| 2015/0322759 A1 | 11/2015 | Okoniewski |
| 2016/0103047 A1 | 4/2016 | Liu |
| 2016/0103049 A1 | 4/2016 | Liu |
| 2016/0130496 A1 | 5/2016 | Holtsclaw et al. |
| 2016/0137904 A1 | 5/2016 | Drake |
| 2016/0177674 A1 | 6/2016 | Shetty et al. |
| 2016/0215202 A1 | 7/2016 | Weaver et al. |
| 2016/0215205 A1 | 7/2016 | Nguyen |
| 2016/0256583 A1 | 9/2016 | Yamada |
| 2016/0265331 A1 | 9/2016 | Weng et al. |
| 2016/0362965 A1 | 12/2016 | Parlar |
| 2017/0015895 A1 | 1/2017 | Cox |
| 2017/0051598 A1 | 2/2017 | Ouenes |
| 2017/0066959 A1 | 3/2017 | Hull et al. |
| 2017/0066962 A1 | 3/2017 | Ravi et al. |
| 2017/0067836 A1 | 3/2017 | Hull et al. |

(56) References Cited

U.S. PATENT DOCUMENTS

| | | | |
|---|---|---|---|
| 2017/0137703 | A1 | 5/2017 | Leverson et al. |
| 2017/0145303 | A1 | 5/2017 | Fontenelle et al. |
| 2017/0145793 | A1 | 5/2017 | Ouenes |
| 2017/0198207 | A1 | 7/2017 | Li et al. |
| 2017/0275525 | A1 | 9/2017 | Koep et al. |
| 2017/0328179 | A1 | 11/2017 | Dykatra et al. |
| 2017/0336528 | A1 | 11/2017 | Badri et al. |
| 2017/0370197 | A1 | 12/2017 | Han et al. |
| 2018/0112126 | A1 | 4/2018 | Yang et al. |
| 2018/0155602 | A1 | 6/2018 | Zhang |
| 2018/0195982 | A1 | 7/2018 | Hull et al. |
| 2018/0355707 | A1 | 12/2018 | Herrera et al. |
| 2019/0078424 | A1 | 3/2019 | Copeland et al. |
| 2019/0211658 | A1 | 7/2019 | Hull et al. |

FOREIGN PATENT DOCUMENTS

| | | |
|---|---|---|
| CN | 1621803 | 5/2012 |
| CN | 103387827 | 11/2013 |
| CN | 102183410 | 5/2014 |
| CN | 104727799 | 6/2015 |
| CN | 105445440 | 3/2016 |
| EP | 247669 | 12/1987 |
| EP | 2480625 | 4/2013 |
| EP | 2480626 | 4/2013 |
| WO | 1997028098 | 8/1997 |
| WO | 00/60379 | 10/2000 |
| WO | 2000060379 | 10/2000 |
| WO | 01/94749 | 12/2001 |
| WO | 2001094749 | 12/2001 |
| WO | 2002064702 | 8/2002 |
| WO | 2004005435 | 1/2004 |
| WO | 2008001218 | 1/2008 |
| WO | 2010138914 | 12/2010 |
| WO | 2011035292 | 3/2011 |
| WO | 2011035294 | 3/2011 |
| WO | 2012051647 | 4/2012 |
| WO | 2012057910 | 5/2012 |
| WO | 2012087887 | 6/2012 |
| WO | 2012087898 | 6/2012 |
| WO | 2012104582 | 8/2012 |
| WO | 2012122505 | 9/2012 |
| WO | 2012171857 | 12/2012 |
| WO | 2013052359 | 4/2013 |
| WO | 2013112114 | 8/2013 |
| WO | 2013149122 | 10/2013 |
| WO | 2013155061 | 10/2013 |
| WO | 2014008598 | 1/2014 |
| WO | 2014123672 | 8/2014 |
| WO | 2015041664 | 3/2015 |
| WO | 2015071750 | 5/2015 |
| WO | 2015097116 | 7/2015 |
| WO | 2015126082 | 8/2015 |
| WO | 2015163858 | 10/2015 |
| WO | 2015181028 | 12/2015 |
| WO | 2015200060 | 12/2015 |
| WO | 2016094153 | 6/2016 |
| WO | 2017035371 | 3/2017 |
| WO | 2017040824 | 3/2017 |
| WO | 2017040834 | 3/2017 |
| WO | 2017086975 | 5/2017 |
| WO | 2017136641 | 8/2017 |
| WO | 2018025010 | 2/2018 |

OTHER PUBLICATIONS

U.S. Appl. No. 15/243,312, filed Aug. 22, 2016, Chen.

Abad et al., "Evaluation of the Material Properties of the Multilayered Oxides formed on HCM12A using New and Novel Techniques," Manuscript Draft, Manuscript No. OXID-D-15-00019, published in 2015, 44 pages.

Abass et al., "Wellbore Instability of Shale Formation; Zuluf Field, Saudi Arabia," presented at the SPE Technical Symposium of Saudi Arabia Section held in Dhahran, Saudi Arabia, May 21-23, 2006, 10 pages.

Abousleiman and Nguyen, "Poromechanics Response of Inclined Wellbore Geometry in Fractured Porous Media," Journal of Engineering Mechanics, ASCE, Nov. 2005, 14 pages.

Abousleiman et al., "A Micromechanically Consistent oroviscoelasticity Theory for Rock Mechanics Applications," Int. J. Rock Mech. Min. Sci. & Geomech. Abstr., vol. 30, No. 7, published in 1993, 4 pages.

Abousleiman et al., "Anisotropic Porothermoelastic Solution and Hydro-Thermal Effects on Fracture Width in Hydraulic Fracturing," Int. J. Numer. Anal. Meth. Geomech., published in 2013, 38: 493-517, 25 pages.

Abousleiman et al., "GeoGenome Industry Consortium (G2IC)," JIP, 2004-2006, 6 pages.

Abousleiman et al., "Geomechanics field characterization of Woodford Shale and Barnett Shale with advanced logging tools and nano-indentation on drill cuttings," The Leading Edge, Jun. 2010, 6 pages.

Abousleiman et al., "Mandel's Problem Revisited," Geotechnique, 46, No. 2, published in 1996, 9 pages.

Abousleiman et al., "Mechanical Characterization of Small Shale Samples subjected to Fluid Exposure using the Inclined Direct Shear Testing Device," Int. J. Rock Mech. & Min. Sci., vol. 47, No. 3, published in 2010, 13 pages.

Abousleiman et al., "Modeling Real-Time Wellbore Stability within the Theory of Poromechanics," AADE-03-NTCE-11, presented at the AADE 2003 National Technology Conference, Practical Solutions for Drilling Challenges, Texas, Apr. 1-3, 2003, 14 pages.

Abousleiman et al., "Poroelastic Solutions in Transversely Isotropic Media for Wellbore and Cylinder," Int. J. Solids Structures, vol. 35, Nos. 34-35, published in 1998, 25 pages.

Abousleiman et al., "Poroviscoelastic Analysis of Borehole and Cylinder Problems," ACTA Mechanica, vol. 119, published in 1996, 21 pages.

Abousleiman et al., "SPE 110120: Geomechanics Field and Laboratory Characterization of Woodford Shale: The Next Gas Play," SPE International, SPE 110120, presented at the 2007 SPE Annual Technical Conference and Exhibition on Nov. 11-14, 2007, 14 pages.

Abousleiman et al., "SPE 124428: GeoMechanics Field Characterization of the Two Prolific U.S. Mid-West Gas Plays with Advanced Wire-Line Logging Tools," SPE International, presented at the 2009 SPE Annual Technical Conference and Exhibition, Oct. 4-7, 2009, 19 pages.

Abousleiman et al., "The Granular and Polymer Composite Nature of Kerogen Rich Shale," Acta Geotechnica 2016, 11 (3), pp. 573-594, 22 pages.

Abousleiman et al., "Time-Dependent wellbore (in)stability predictions: theory and case study," IADC/SPE 62796, presented at the 2000 IADC/SPE Asia Pacific Drilling Technology held in Kuala Lumur, Malaysia, Sep. 11-13, 2000, 8 pages.

Agenet et al., "SPE 157019: Fluorescent Nanobeads: a First Step Toward Intelligent Water Tracers," Society of Petroleum Engineers, SPE International Oilfield Nanotechnology conference, Jun. 12-14, 2012, 13 pages.

Agilent "Field-Deployable Solution for Nanoporosity Measurements in Mud Logging Operations and a Novel Method for Fracability Analysis Using Mud Cuttings," Agilent Technologies, Oct. 2013, 44 pages.

Ahmed et al. "7.2.2 Information Required to Move to a Pilot Project," Unconventional Resources Exploitation and Development, 2016, 1 page.

Allan et al., "A Multiscale Methodology for the Analysis of Velocity Anisotropy in Organic-Rich Shale," Geophysics, vol. 80, No. 4, Jul.-Aug. 2015, 16 pages.

Al-Munthasheri, "A Critical Review of Hydraulic Fracturing Fluids over the Last Decade," SPE 169552, presented at the SPE Western North American and Rocky Mountain Joint Regional Meeting, Apr. 16-18, 2014, 25 pages.

Altowairqi, "Shale elastic property relationships as a function of total organic carbon content using synthetic samples," Journal of Petroleum Science and Engineering vol. 133, Sep. 2015, 9 pages.

(56) References Cited

OTHER PUBLICATIONS

Ananthan et al., "Influence of Strain Softening on the Fracture of Plain Concrete Beams," Int. J. of Fracture, vol. 45, published in 1990, 25 pages.

Anisimov, "SPE 118862: The Use of Tracers for Reservoir Characterization," Society of petroleum Engineers (SPE), presented at SPE Middle East Oil and Gas Show and Conference, Mar. 15-18, 2009, 8 pages.

Arns et al., "Computation of linear elastic properties from microtomographic images: Methodology and agreement between theory and experiment," Geophysics, vol. 67, No. 5, Sep. 1, 2002, pp. 1396-1405, 10 pages.

Aslan et al., "Fluorescent Core—Shell AG@$SiO_2$ Nanocomposites for Metal-Enhanced Fluorescence and Single Nanoparticle Sensing Platforms," Jan. 19, 2007, 2 pages.

Ballice, "Solvent Swelling Studies of Goynuk (Kerogen Type-I) and Beypazari Oil Shales (Kerogen Type-II)," Science Direct, Fuel vol. 82, published in 2003, 5 pages.

Barati and Liang, "A Review of Fracturing Fluid Systems Used for Hydraulic Fracturing of Oil and Gas Wells," Journal of Applied Polymer Science, vol. 131, Issue 16, Aug. 15, 2014, 11 pages.

Barenblatt et al., "Basic Concepts in the Theory of Seepage of Homogeneous Liquids in Fissured Rocks (Strata)," PMM vol. 24, No. 5, 1960, 18 pages.

Bazant et al., "Deformation of Progressively Cracking Reinforced Concrete Beams," ACI Journal, Technical Paper, Title No. 81-26, vol. 81, No. 3, May-Jun. 1984, 11 pages.

Bazant et al., "Size Effect in Brazilian Split-Cylinder Tests: Measurements and Fracture Analysis," ACI Materials Journal, vol. 88, No. 3, May 31, 1991; pp. 325-332.

Bazant et al., "Strain-Softening Bar and Beam: Exact Non-Local Solution," Int. J. Solids Structures, vol. 24, No. 7, published in 1988, 15 pages.

Bennett et al., "Instrumented Nanoindentation and 3D Mechanistic Modeling of a Shale at Multiple Scales," Acta Geotechnica, vol. 10, No. 21, Jan. 9, 2015; 14 pages.

Berryman, "Extension of Poroelastic Analysis to Double-Porosity Materials: New Technique in Microgeomechanics," Journal of Eng. Mech., vol. 128, No. 8, 2002, 8 pages.

Bhandari et al., "Two-Dimensional DEM Analysis of Behavior of Geogrid-Reinforced Uniform Granular Bases under a Vertical Cyclic Load, Acta Geotechnica," published in 2014, 12 pages.

Biot et al., "Temperature analysis in hydraulic fracturing," Journal of Petroleum Technology, vol. 39, No. 11, Nov. 1987, 9 pages.

Biot, "General Theory of Three-Dimensional Consolidation," Journal of Applied Physics, vol. 12, No. 2, Feb. 1941, 11 pages.

Bisnovat et al., "Mechanical and petrophysical behavior of organic-rich chalk from the Judea Plains, Israel," Marine and Petroleum Geology, vol. 64, Jun. 2015, 13 pages.

Bobko et al., "The Nanogranular Origin of Friction and Cohesion in Shale—A Strength Homogenization Approach to Interpretation of Nanoindentation Results," Int. J. Numer. Anal. Meth. Geomech., published in 2010, 23 pages.

Boskey et al., "Perspective—Collagen and Bone Strength," Journal of Bone and Mineral Research, vol. 14, No. 3, published in 1999, 6 pages.

Bratton et al., "The Nature of Naturally Fractured Reservoirs," June Oilfield Review, 2006, 21 pages.

Brochard et al., "Fracture Properties of Kerogen and Importance for Organic-Rich Shales," Annual World Conference on Carbon (Carbon 2013), Jul. 2013, 5 pages.

Bunzil et al., "Taking advantage of luminescent lanthanide ions," Chemical Society Reviews, Dec. 2005, 29 pages.

Caenn et al., "Chapter 9: Wellbore Stability," p. 359, in Composition and Properties of Drilling and Completion Fluids, 7th Edition: Gulf Professional Publishing, 2016, 1 page.

Cahill et al., "Nanoscale Thermal Transport II," Applied Physics Reviews 1.1, 2014, 46 pages.

California Council on Science and Technology Lawrence Berkeley National Laboratory Pacific Institute, "Advanced Well Stimulation Technologies in California: An Independent Review of Scientific and Technical Information," CCST, Jul. 2016, 400 pages.

Carcione and Avseth, "Rock-physics templates for clay-rich source rocks," Geophysics vol. 80, Issue 5, D481-D500, Sep. 2015, 21 pages.

Carter and Hanson, "Fake Moon Dirt, Hood Solar System Science," UT Dallas Magazine, vol. 6, Issue 2, Spring 2016, 1 page.

Chang et al., "Magnetic SERS Composite Nanoparticles for Microfluidic Detection," 251st ACE National Meeting, Mar. 13-17, 2016, 1 pages.

Chang, "In-Situ Formation of Proppant and Highly Permeable Blocks for Hydraulic Fracturing," SPE Hydraulic Fracturing Technology Conference 2015.

Chen et al., "Size Effect in Micro-Scale Cantilever Beam Bending, "Acta Meeh., published in 2011, 17 pages.

Chen et al., "FITC functionalized magnetic core-shell $Fe_3O_4$/Ag hybrid nanoparticle for selective determination of molecular biothiols," Elsevier Ltd., Dec. 2013, 7 pages.

Chern et al., "Deformation of Progressively Cracking Partially Prestressed Concrete Beams," PCI Journal, vol. 37, No. 1, published in 1992, 11 pages.

Cheshomi et al., "Determination of uniaxial compressive strength of microcystalline limestone using single particles load test," Journal of Petroleum Science and Engineering, vol. 111, 2013, 6 pages.

Chuang et al., "Ultra-sensitive in-situ detection of novel near-infrared persistent luminescent tracer nanoagents in crude oil-water mixtures," a nature research journal, Scientific Reports, Jun. 15, 2016, 5 pages.

Chupin et al., "Finite Strain Analysis of Nonuniform Deformation Inside Shear Bands in Sands," Int. J. Numer. Anal. Meth. Geomech., published in 2012, 16 pages.

Corapcioglu, "Fracturing Fluid Effects on Young's Modulus and Embedment in the Niobrara Formation," Thesis for degree of Master of Science (Petroleum Engineering), Colorado School of Mines, 2014, 189 pages.

Cubillos et al., "SPE 174394-MS: The Value of Inter-well and Single Well Tracer Technology for De-Risking and Optimizing a CEOR Process—Caracara Field Case," Society of Petroleum Engineers (SPE), presented at EUROPEC 2015, Jun. 1-4, 2015, 19 pages.

Cui et al., "Poroelastic Solution for an Inclined Borehole," Transactions of the ASME, vol. 64, Mar. 1997, 7 pages.

Custelcean et al., "Aqueous Sulfate Separation by Crystallization of Sulfate-Water Clusters," Angew. Chem. Int. Ed., published in 2015, vol. 54, pp. 10525-10529.

Dagan, "Models of Groundwater Flow in Statistically Homogeneous Porous Formations," Water Resource Res. Vol. 15, Feb. 1979, 17 pages.

Daneshy, "Hydraulic Fracturing to Improve Production," Tech 101, TheWayAhead, vol. 6, No. 3, Oct. 2010, 4 pages.

Das et al., "Molecular Fluorescence, Phosphorescence, and Chemiluminescence Spectrometry," Analytical Chemistiy, Nov. 3, 2011, 29 pages.

De Block et al., "SPE-177601-MS: A New Solution for the Characterization of Unconventional Shale Resources Based on Analysis or Drill Cutting," SPE International, presented at the Abu Dhabi International Petroleum Exhibition and Conference, Nov. 9-12, 2015, 6 pages.

De Rocha et al., "Concentrated CO2-in-Water Emulsions with Nonionic Polymeric Surfactants," J. Colloid Interface Sci. 2001 239 (1), pp. 241-253, 13 pages.

Deans, "SPE 7076: Using Chemical Tracers to Measure Fractional Flow and Saturation In-Situ," Society of Petroleum Engineers (SPE), presented at SPE Symposium on improved Methods of Oil Recoveiy, Apr. 16-17, 1978, 10 pages.

Deirieh et al., "Nanochemomechanical Assessment of Shale: A Coupled WDS-Indentation Analysis," Acta Geotechnica, published in 2012, 25 pages.

Delafargue and Ulm, "Explicit approximations of the indentation modulus of elastically orthotropic solids for conical indenters," International Journal of Solids and Structures vol. 41, Issue 26, Dec. 2004, 10 pages.

(56) References Cited

OTHER PUBLICATIONS

Detournay and Cheng, "Poroelastic Response of a Borehole in a Non-Hydrostatic Stress Field," International Journal of Rock Mechanics, Min. Science and Geomech. Abstracts, vol. 25, No. 3, 1988, 12 pages.

Devarapalli et al., "Micro-CT and FIB-SEM imaging and pour structure characterization of dolomite rock at multiple scales," Arabian Journal of Geosciences, Aug. 2017, 9 pages.

Du et al., "SPE 93140: Interwell Tracer Tests: Lessons Learned from past Field Studies," Society of Petroleum Engineers (SPE), presented at SPE Asia Pacific Oil and Gas Conference and Exhibition, Apr. 5-7, 2005, 9 pages.

Eastoe et al, "Water-in-CO2 Microemulsions Studied by Small-Angle Neutron Scattering," Langmuir 1997, 13(26), pp. 6980-6984, 5 pages.

Ehlig-Economides and Economides, "Water as Poppant," SPE-147603, presented at the SPE Annual Technical Conference and Exhibition, Oct. 30-Nov. 2, 2011, 8 pages.

Ekbote et al., "Porochemoelastic Solution for an Inclined Borehole in a Transversely Isotropic Formation," J. of Eng. Mech., ASCE, Jul. 2006, 10 pages.

El-Aneed et al., "Mass Spectrometry, Review of the Basics: Electrospray, MALDI, and Commonly Used Mass Analyzers," Applied Spectroscopy Reviews, Mar. 16, 2009, 22 pages.

Elijah, "Numerical Modeling of Wellbore Instability (Tensile Failure) Using Fracture Mechanics Approach," Thesis for the degree of Master of Science, African University of Science and Technology Abuja, May 2013, 77 pages.

Eliyahu et al., "Mechanical Properties of organic matter in shales mapped at the nanometer scale," Marine and Petroleum Geology, vol. 59, pp. 294-304, Sep. 18, 2014, 11 pages.

Ertas et al., "Petroleum Expulsion Part 1. Theory of Kerogen Swelling in Multicomponent Solvents," Energy & Fuels, published in 2006, 6 pages.

Eseme et al., "Review of mechanical properties of oil shales: implications for exploitation and basin modeling," Oil Shale, vol. 24, No. 2, Jan. 2007, 16 pages.

Esfahani et al., "Quantitative nanoscale mapping of three-phase thermal conductivities in filled skutterudites via scanning thermal microscopy," Nature Science Review, vol. 5, Issue 1, Feb. 2017, 31 pages.

Ewy, "Shale Swelling/Shrinkage and Water Content Change due to Imposed Suction and Due to Direct Brine Contact," Acta Geotechnica, published in 2014, 18 pages.

Ewy, "Wellbore-Stability Predictions by Use of a Modified Lade Criterion," SPE Drill and Completion, vol. 14, No. 2, Jun. 1999, 7 pages.

fekete.com [online], "Dual Porosity," retrieved from URL <www.fekete.com/SAN/WebHelp/FeketeHarmony/Harmony_WebHelp/Content/HTML_Files/Reference_Material/General_Concepts/Dual_Porosity.htm>, available on or before 2014, retrieved on Nov. 11, 2019, 6 pages.

Fjaer et al., "Stresses around Boreholes. Borehole Failure Criteria," in Petroleum Related Rock Mechanics, 2nd Edition, Elsevier Science, 2008, p. 156, 1 page.

Frazer et al., "Localized Mechanical Property Assessment of SiC/SiC Composite Materials," Science Direct, Part A 70, published in 2015, 9 pages.

Gallegos and Varela, "Trends in Hydraulic Fracturing Distributions and Treatment Fluids, Additives, Proppants, Water Volumes Applied to Wells Drilled in the United States from 1947 through 2010—Data Analysis and Comparison to the Literature," USGS, United States Geological Survey, 2015, 24 pages.

Gandossi and Estorff, "An overview of hydraulic fracturing and other formation stimulation technologies for shale gas production," JRC Science for Policy Report, European Commission, EUR 26347 EN, Jan. 2013, 62 pages.

Ganjdanesh et al., "Treatment of Condensate and Water Blocks in Hydraulic-Fractured Shale-Gas/Condensate Reservoirs," SPE-175145, presented at the SPE Annual Technical Conference and Exhibition, Sep. 28-30, 2015, published in SPE Journal, Apr. 2016, 10 pages.

Gao et al., "Materials Become Insensitive to Flaws at Nanoscale: Lessons from Nature," PNAS, vol. 100, No. 10, May 13, 2003, 628 pages.

Gardiner et al., "Practical Raman Spectroscopy," Springer-Verlag, 1989, 9 pages.

Garnero, "The Contribution of Collagen Crosslinks to Bone Strength," Int. Bone & Mineral Society, Sep. 2012, 8 pages.

George et al., "Approximate relationship between frequency-dependent skin depth resolved from geoelectronnagnetic pedotransfer function and depth of investigation resolved from geoelectrical measurements: A case study of coastal formation, southern Nigeria," Oct. 2016, J. Earth Syst. Sci.; 1379-1390.

Georgi et al., "Physics and Chemistry in Nanoscale Rocks," Mar. 22-26, 2015, La Jolla, California, USA, SPE Forum Series; 4 pages.

Glossary.oilfield.slb.com [online], "Oilfield Glossary: fluid-friction reducer," available on or before Jun. 15, 2017, retrieved from URL< http://www.glossary.oilfield.slb.com/Terms/f/fluid-friction_reducer.aspx>, 1 page.

Glover et al., "ARMA 16-0737: The Use of Measurements Made on Drill Cuttings to Construct and Apply Geomechanical Well Profiles," ARMA, presentation at the 50th US Rock Mechanics/Geomechanics Symposium, Jun. 26-29, 2016, 11 pages.

Golomb et al, "Macroemulsion of liquid and supercritical CO2-in-water and water-in-liquid CO2 stabilized with fine particles," Ind. Eng. Chem. Res. 2006, 45(8), pp. 2728-2733, 6 pages.

Goodman, "Introduction to Rock Mechanics," John Wiley & Sons, Chapter 3: Rock Strength and Failure Criteria; 21 pages.

Gu and Mohanty, "Effect of Foam Quality on Effectiveness of Hydraulic Fracturing in Shales," International Journal of Roch Mechanics and Mining Sciences, vol. 70, 2014, 13 pages.

Han et al., "Application of Silver-Coated Magnetic Microspheres to a SERS-Based Optofluidic Sensor," The Journal of Physical Chemistry (JPCC), Mar. 7, 2011, 7 pages.

Han et al., "LBM-DEM Modeling of Fluid-Solid Interaction in Porous Media," Int. J. Numer. Anal. Meth. Geomech., published in 2013, 17 pages.

Han et al., "Numerical and Experimental Studies of Kerogen Rich Shales on Millimeter-Scale Single-Edge Notched Beam," prepared for presentation at the 53rd US Rock Mechanics and Geomechanics Symposium in New York, Jun. 23-26, 2019, 8 pages.

Han et al., "Numerical Modeling of Elastic Hemispherical Contact for Mohr-Coulomb Type Failures in Micro-Geomaterials," Experimental Mechanics, vol. 57, Jun. 16, 2017, 15 pages.

Harrison et al, "Water-in-Carbon Dioxide Microemulsions with a Fluorocarbon-Hydrocarbon Hybrid Surfactant," Langmuir 1994, 10(10), pp. 3536-3541, 6 pages.

Hiramatsu and Oka, "Stress around a shaft or level excavated in ground with a three-dimensional stress state," Mem. Fra. Eng. Kyotu Univ. vol. 24, 1962, 2 pages Abstract.

Hoang et al., "Correspondence Principle Between Anisotropic Poroviscoelasticity and Poroelasticity using Micromechanics and Application to Compression of Orthotropic Rectangular Strips," Journal of Applied Physics, American Institute of Physics, vol. 112, Aug. 30, 2012, 16 pages.

Hoek and Brown, "Empirical Strength Criterion for Rock Masses," Journal of the Geotechnical Engineering Division, Sep. 1980, 20 pages.

Hornby et al., "Anisotropic Effective-Medium Modeling of the Elastic Properties of Shales," Geophysics, vol. 59, No. 10, Oct. 1994, 14 pages.

Hosemann et al, "Mechanical Characteristics of SiC Coating Layer in TRISO Fuel Particles," Journal of Nuclear Materials, vol. 442, published in 2013, 10 pages.

Hosemann et al., "An Exploratory Study to Determine Applicability of Nano-Hardness and Micro-compression Measurements for Yield Stress Estimation," Science Direct, published in 2008, 9 pages.

Hu et al., "Smart Liquid SERS Substrates based on $Fe_3O_4$/Au Nanoparticles with Reversibility Tunable Enhancement Factor for Practical Quantitative Detection," a nature research journal, Scientific Reports, Nov. 27, 2014, 10 pages.

(56) References Cited

OTHER PUBLICATIONS

Hull and Abousleiman, "New Frontiers in Oil and Gas Exploration," Chapter 10: Insights of the Rev of Source Shale from Nano- and Micromechanics, Springer International Publishing Switzerland, 2016, 29 pages.

Hull et al, "Nanomechanical Characterization of the Tensile Modulus of Rupture of Kerogen-Rich Shale," SPE Journal 2017, 22 (4), pp. 1024-1033, 10 pages.

Hull et al., "Recent Advances in Viscoelastic Surfactants for improved Production from Hydrocarbon Reservoirs," SPE Journal, 2016.

Huseby et al., "SPE-169183-MS: High Quality Flow Information from Tracer Data," Society of Petroleum Engineers (SPE), presented at the SPE Bergen One Day Seminar, Apr. 2, 2014, 9 pages.

Hutchins et al., "SPE-21049: Aqueous Tracers for Oilfield Applications," Society of Petroleum Engineers (SPE), presented at SPE International Symposium on Oilfield Chemistry, Feb. 20-22, 1991, 9 pages.

Hydraulic Fracturing Fluid Product Component Information Disclosure; 2 pages.

Iqbal et al., "In situ micro-cantilver tests to study fracture properties of NiAl single crystals," Acta Materialia, vol. 60, No. 3, Feb. 2012; 8 pages.

itascacg.com [online], "Three-dimensional Fast Lagrangian Analysis of Continua (FLAC3D)," available on or before 2012, [retrieved on Jun. 7, 2018], retrieved from URL: <https://www.itascacg.com/software/flac3d>, 4 pages.

itascacg.com [online], "Particle Flow Code, Version 5.0," Itasca Consulting Group, Inc., available on or before Apr. 11, 2014, [retrieved on May 11, 2018], retrieved from URL: <https://www.itascacg.com/software/pfc>, 5 pages.

Iyengar et al., "Analysis of Crack Propagation in Strain-Softening Beams," Engineering Fracture Mechanics, published in 2002, 18 pages.

Jaeger et al., "Fundamentals of Rock Mechanics," 4th Edition, Wiley, 2007, 486 pages.

Jia et al., "Highly Efficient Extraction of Sulfate Ions with a Tripodal Hexaurea Receptor," Angew. Chem. Int. Ed., published in 2011, vol. 50, pp. 486-490.

Jianhong et al., "Estimation of the Tensile Elastic Modulus using Brazilian disc by Applying Diametrically Opposed Concentrated Loads," International Journal of Rock Mechanics & Mining Sciences, vol. 46, No. 3, published in 2009, 568-576.

Johnston et al, "Water-in-Carbon Dioxide Microemulsions: An Environment for Hydrophiles Including Proteins," Science, vol. 271, issue 5249, pp. 624-626, Feb. 2, 1996, 3 pages.

Jose et al., "Continuous multi cycle nanoindentation studies on compositionally graded $Ti_{1-x}Al_xN$ multilayer thin films," (XP028230250) Materials Science and Engineering: A, Elsevier, vol. 528, No. 21, Apr. 20, 2011; 7 pages.

Jun et al., "Multifunctional Silver-Embedded Magnetic Nanoparticles as SERS Nanoprobes and Their Applications," Wiley-VCH Verlag GmbH& Co. KGaA, Weinheim, Jan. 4, 2010, 7 pages.

Kelemon et al., "Petroleum Expulsion Part 2. Organic Matter Type and Maturity Effects on Kerogen Swelling by Solvents and Thermodynamic Parameters for Kerogen from Regular Solution Theory," Energy & Fuels, published in 2006, 8 pages.

Kethireddy, "Quantifying the effect of kerogen on Electrical Resistivity Measurements in Organic Rich Source Rocks," Thesis in partial fulfillment of the requirements for the degree of Master of Science, Dec. 2013, 78 pages.

Kim et al., "Numerical analysis of fracture propagation during hydraulic fracturing operations in shale gas systems," International Journal of Rock and Mechanics Mining Sciences vol. 76, 2015.

King, "Thirty Years of Gas Shale Fracturing: What Have We Learned?" SPE-133456, presented at the SPE Annual Technical Conference and Exhibition, Sep. 19-22, 2010, 50 pages.

Klapetek, "Chapter 11: Thermal Measurements," Quantitative Data Processing in Scanning Probe Microscopy: SPE Applications for Nanometrology, 2018, 26 pages.

Kneipp et al., "Single Molecule Detection Using Surface-Enhanced Raman Scattering (SERS)," Physical Review Letters, American Physical Society vol. 78, No. 9, Mar. 3, 1997, 4 pages.

Kolymbas, "Kinematics of Shear Bands," Acta Geotechnica, published in 2009, 4 pages.

Kumar et al., "SPE 159804: Nano to Macro Mechanical Characterization of Shale," SPE International, presented at the SPE Annual Technical Conference and Exhibition, Oct. 8-10, 2012, 23 pages.

Kuperkar et al., "Visoelastic micellar water/CTAB/NaNO3 Solutions: Reology, SANS and cyro-TEM Analysis," Journal of Colloid and Interface Science, vol. 323, 403-409, 2008, 7 pages.

Lam et al., "Experiments and Theory in Strain Gradient Elasticity," J. Mech. And Phys. Of Solids, published in 2003, 32 pages.

Larsen et al., "Changes in the Cross-Link Density of Paris Basin Toarcian Kerogen During Maturation," Organic Geochemistry, published in 2002, 10 pages.

Laurent Brochard et al.; "Fracture Properties of Kerogen and Importance for Organic-Rich Shales," Annual World Conference on Carbon (Carbon 2013), Jul. 2013, Rio de Janeiro, Brazil. HAL ID: hal-01274161, 6 pages.

Lee et al, "Water-in carbon dioxide emulsions: Formation and stability" Langmuir, 1999, 15(20), pp. 6781-6791, 11 pages.

Li et al., "A review of crosslinked fracturing fluids prepared with produced water," Petroleum 2, vol. 2, Issue 4, Dec. 2016, 11 pages.

Li et al., "Differentiating Open Natural Fractures from Healed Fractures Using the New, High-Definition Oil-Based Mud Microelectrical Imager-Case Studies from Organic Rich Shales," presented at the SPE Annual Technical Conference and Exhibition held in Houston, Texas, Sep. 28-30, 2015, 16 pages.

Li et al., "High-Temperature Fracturing Fluids Using Produced Water with Extremely High TDS and Hardness," IPTC-17797-MS, Dec. 2014, 13 pages.

Li et al., "Mechanical Characterization of Micro/Nanoscale Structures for MEMS/NEMS Applications using Nanoindentation Techniques," Science Direct, published in 2003, 775 pages.

Li et al., "The Brazilian Disc Test for Rock Mechanics Applications: Review and New Insights," Rock Mech Rock Eng, published in 2013, 46: pp. 269-287.

Li et al., "Well Treatment Fluids Prepared With Oilfield Produced Water: Part II," SPE-133379-MS, Sep. 2010, 7 pages.

Liang et al., "An Experimental Study on interactions between Imbibed Fractured Fluid and Organic-Rich Tight Carbonate Source Rocks," SPE-188338-MS, Abu Dhabi International Petroleum Exhibition and Conference, Nov. 13-16, 2017, 14 pages.

Liu and Abousleiman, "Effects of Mudcake and Formation N-Porosity N-Permeability on Wellbore Stability," SPE Journal, Oct. 2018, 25 pages.

Liu and Abousleiman, "Multiporosity/Multipermeability Inclined-Wellbore Solutions with Mudcake Effects," SPE Journal vol. 23, No. 5, Oct. 2018, 25 pages.

Liu and Abousleiman, "N-Porosity and N-Permeability generalized wellbore stability analytical solutions and applications," presented at the 50th US Rock Mechanics/Geomechanics Symposium held in Houston, Texas, Jun. 26-29, 2016, 10 pages.

Liu and Abousleiman, "Poroelastic Dual-Porosity/Dual-Permeability After-Closure Pressure-Curves Analysis in Hydraulic Fracturing," SPE Journal 2016, 21 pages.

Liu, "Dimension effect on mechanical behavior of silicon microcantilever beams," Measurement, vol. 41, No. 8, Oct. 2008; 11 pages.

Liu, "Elastic Constants Determination and Deformation Observation Using Brazilian Disk Geometry," Experimental Mechanics, published in 2010, 50: pp. 1025-1039.

Liu et al., "Applications of nano-indentation methods to estimate nanoscale mechanical properties of shale reservoir rocks," Journal of Natural Gas Science and Engineering, Elsevier, Amsterdam, NL, vol. 35, Sep. 29, 2016, 10 pages.

Liu et al., "Microstructural and geomechanical analysis of Bakken shale at nanoscale," Journal of Petroleum Science and Engineering, vol. 153, Mar. 23, 2017, 12 pages.

Liu et al., "Safe Drilling in Chemically Active and Naturally Fractured Source Rocks: Analytical Solution and Case Study,"

(56) References Cited

OTHER PUBLICATIONS

Society of Petroleum Engineers/IADC, IADC/SPE Drilling Conference and Exhibition, Fort Worth Texas, Mar. 6-8, 2018.
Liu, "Fracture Toughness Assessment of Shales by Nanoindentation," Thesis for the degree of Master of Science in Civil Engineering, Geotechnical Engineering Masters Projects, University of Massachusetts Amherst, Sep. 2015, 80 pages.
Liu, "Micro-cantilever Testing to Evaluate the Mechanical Properties of Thermal Barrier Coatings," 19th European Conference on Fracture (ECF19): Fracture Mechanics for Durability, Reliability and Safety; Conference Proceedings held Aug. 26-31, 2012, Kazan, Russia; 7 pages.
Long et al., "Chapter Two: Advanced Well Stimulation Technologies," in an Independent Scientific Assessment of Well Stimulation in California, vol. I, Well Stimulation Technologies and their Past, Present and Potential Future Use in California, Jan. 2015, 62 pages.
Low, "Advances in Ceramic Matrix Composites: Second Edition," Processing, properties, and applications of SiC, 2018, 11 pages.
Lu et al., "Fabrication and characterization of ceramic coatings with alumina-silica sol-incorporated a-alumina powder coated on woven quartz fiber fabrics," vol. 39, Issue 6, Aug. 2013, pp. 6041-6050.
Luan et al., "Creation of synthetic samples for physical modelling of natural shale," Geophysical Prospecting vol. 64, Jul. 2016, 17 pages.
Lyngra et al. "Heavy Oil Characterization: Lessons Learned During Placement of a Horizontal Injector at a Tar/Oil Interface," SPE-172673-MS, Society of Petroleum Engineers, presented at the SPE Middle East Oil & Gas Show and Conference, Bahrain, Mar. 8-11, 2015, 20 pages.
Mahabadi et al., "A novel approach for micro-scale characterization and modeling of geomaterials incorporating actual material heterogeneity," (XP002689941) Geophysical Research Letters, American Geophysical Union, vol. 39, No. 1, L01303, Jan. 1, 2012, 6 pages.
Mahmoud et al., "Removal of Pyrite and Different Types of Iron Sulfide Scales in Oil and Gas Wells without H2S Generation," (IPTC-18279-MS) Presented at the International Petroleum Technology Conference (IPTC), Doha, Qatar, Dec. 6-9, 2015, 8 pages.
Maio et al., "Measuring Fracture Toughness of Coatings using Focused-ion-beam-machined Microbeams," published in 2004, 4 pages.
Marchetti et al., "Fluorous affinity chromatography for enrichment and determination of perfluoroalkyl substances," Annual Review of Analytical Chemistry vol. 84, Jul. 19, 2012, 8 pages.
Maxwell, "Microseismic hydraulic fracture imaging: The path toward optimizing shale gas production," The Leading Edge, Mar. 2011, 6 pages.
McMahon et al., "First 100% Reuse of Bakken Produced Water in Hybrid Treatments Using Inexpensive Polysaccharide Gelling Agents," SPE-173783-MS, Apr. 2015, 9 pages.
Mehrabian and Abousleiman, "Generalized Biot's Theory an Mandel's Problem of Multiple Porosity and Multiple-Permeability Poroelasticity," Journal of Geological Research: Solid Earth, vol. 119, No. 4, 2014, 19 pages.
Mesa, "Spherical and rounded cone nano indenters," Micro Star Technologies Inc., available on or before Jan. 23, 2018, 24 pages.
Meyers et al., "Point load testing of drill cuttings from the determination of rock strength," ARMA-05-712, 40th U.S. Symposium on Rock Mechanics (USRMS), Alaska Rocks 2005, American Rock Mechanics Association, Jun. 25-29, 2005, 2 pages, Abstract.
Middleton et al, "Shale gas and non-aqueous fracturing fluids: Opportunities and challenges for supercritical CO2," Applied Energy 2015, 147, pp. 500-509, 10 pages.
Montgomery and Smith, "Hydraulic Fracturing: History of Enduring Technology," Journal of Petroleum Technology, Dec. 2010, 7 pages.
Montgomery, "Chapter 2: Fracturing Fluid Components," Intech open science | open minds, Montgomery, 2013, 21 pages.
Montgomery, "Fracturing Fluids," Chapter 1, Effective and Sustainable Hydraulic Fracturing, Intech, the proceedings of the International Conference for Effective and Sustainable Hydraulic Fracturing (HF2103) on May 20-22, 2013, 23 pages.
Moyer, "A Case for Molecular Recognition in Nuclear Separations: Sulfate Separation from Nuclear Wastes," Inorganic Chemistry, copyright 2012, pp. 3473-3490.
Moyner et al., "The Application of Flow Diagnostics for Reservoir Management," Society of Petroleum Engineers (SPE), Apr. 2015, 18 pages.
Nguyen and Abousleiman, "Poromechanics Response of Inclined Wellbore Geometry in Chemically Active Fractured Porous Media," Journal of Engineering Mechanics, vol. 135, No. 11, Nov. 2005, 14 pages.
Oliver and Pharr, "An improved technique for determining hardness and elastic modulus using load and displacement sensing indentation experiments," Journal of Materials Research, vol. 7, No. 6, Jun. 1992, 20 pages.
Oliver and Pharr, "Measurement of hardness and elastic modulus by instrumented indentation: Advances in understanding and refinements to methodology," Journal of Materials Research, vol. 19, No. 1, Jan. 2004, 18 pages.
Ortega et al., "The Effect of Particle Shape and Grain-Scale Properties of Shale: A Micromechanics Approach," Int. J. Numer. Anal. Methd. Geomech., published in 2010, 33 pages.
Ortega et al., "The Effect of the Nanogranular Nature of Shale on their Poroelastic Behavior," Acta Geotechnica, published in 2007, 28 pages.
Ortega et al., "The Nanogranular Acoustic Signature of Shale," Geophysics, vol. 74, No. 3, May-Jun. 2009, 20 pages.
Osman and Pao, "Mud Weight Prediction for Offshore Drilling," 8 pages.
Ottesen, "Wellbore Stability in Fractured Rock," IADC/SPE 128728, Society of Petroleum Engineers, presented at the 2010 IADC/SPE Drilling Conference and Exhibition, Louisiana, Feb. 2-4, 2010, 8 pages.
Pant, "Nanoindentation characterization of clay minerals and clay-based hybrid bio-geomaterials," disseration for degree of Doctor of Philosophy in the Department of Civil and Environmental Engineering at the Louisiana State University and Agricultural and Medical College, Dec. 2013, 111 pages.
Passey et al., "From Oil-Prone Source Rock to Gas-Producing Shale Reservoir—Geologic and Petrophysical Characterization of Unconventional Shale-Gas Reservoirs," Society of Petroleum Engineers International, CPS/SPE International Oil & Gas Conference and Exhibition, Beijing, China, Jun. 8-10, 2010, 29 pages.
Patel et al., "Analysis of US Hydraulic Fracturing Fluid System and Proppant Trends," SPE 168645, presented at the SPE Hydraulic Fracturing technology Conference, Feb. 4-6, 2014, 20 pages.
Petoud et al., "Brilliant SM, Eu, Tb, and Dy Chiral Lanthanide Complexes with Strong Circularly Polarized Luminescence," Journal for the American Chemical Society (JACS), Dec. 15, 2006, 7 pages.
petrowiki.org [online], "Fluid flow in naturally fractured reservoirs," retrieved from URL <https://petrowiki.org/Fluid_flow_in_naturally_fractured_reservoirs>, available on or before Jul. 16, 2015, retrieved on Nov. 11, 2019, 12 pages.
Podio et al., "Dynamic Properties of Dry and Water-Saturated Green River Shale under Stress," Jun. 11, 1968, SPE 1825, 16 pages.
Pollard, D. D.and Fletcher, R.C., "Fundamentals of Structural Geology," Cambridge University Press, Sep. 1, 2005; p. 291.
Pollock and Hammiche, "Micro-thermal analysis: techniques and applications," Journal of Physics D: Applied Physics, vol. 34.9, 2001, 31 pages.
Poon et al., "An Analysis of Nanoindentation in Linearly Elastic Solids," International Journal of Solids and Structures, vol. 45, No. 24, Dec. 1, 2008; 16 pages.
Qin et al, "Applicability of nonionic surfactant alkyl polyglucoside in preparation of liquid CO2 emulsion," Journal of CO2 Utilization, 2018, 26, pp. 503-510, 8 pages.
Rajbanshi et al., "Sulfate Separation from Aqueous Alkaline Solutions by Selective Crystallization of Alkali Metal Coordination Capsules," Cryst. Growth Des., published in 2011, pp. 2702-2706.

(56) References Cited

OTHER PUBLICATIONS

Ribeiro and Sharma, "Fluid Selection for Energized Fracture Treatments," SPE 163867, presented at the SPE Hydraulic Fracturing Technology Conference, Feb. 4-6, 2013, 11 pages.
Richard et al, "Slow Relaxation and Compaction of Granular Systems," Nature Materials, vol. 4, Feb. 2005, 8 pages.
Rodriguez et al., "Imagining techniques for analyzing shale pores and minerals," National Energy Technology Laboratory, Dec. 2, 2014, 44 pages.
Rostami et al., "DABCO tribromide immobilized on magnetic nanoparticle as a recyclable catalyst for the chemoselective oxidation of sulfide using H2O2 under metaland solvent-free condition," Catal. Commun. 2014, 43, 16-20, 20 pages.
Rowan et al., "Dynamic Covalent Chemistry," Angewante Chemie International Edition, Mar. 15, 2002, 55 pages.
Ryoo et al, "Water-in-Carbon Dioxide Microemulsions with Methylated Branched Hydrocarbon Surfactants," Industrial & Engineering Chemistry Research 2003, 42(25): pp. 6348-6358, 11 pages.
Sagisaka et al., "A New Class of Amphiphiles Designed for Use in Water-in-Supercritical CO2 Microemulsions," Langmuir 2016, 32(47): pp. 12413-12422, 44 pages.
Sagisaka et al., "Effect of Fluorocarbon and Hydrocarbon Chain Lengths in Hybrid Surfactants for Supercritical CO2," Langmuir 2015, 31(27): pp. 7479-7487, 36 pages.
Sagisaka et al, "Nanostructures in Water-in-CO2 Microemulsions Stabilized by Double-Chain Fluorocarbon Solubilizers," Langmuir 2013, 29(25): pp. 7618-7628, 11 pages.
Santarelli et al., "Drilling through Highly Fractured Formations: A Problem, a Model, and a Cure," presented at the 67th Annual Technical Conference and Exhibition of the Society of Petroleum Engineers, Washington D.C., Oct. 4-7, 1992, 10 pages.
Sayed and Al-Muntasheri, "A Safer Generation of Wettability Alteration Chemical Treatments," SPE-184566-MS, presented at the SPE International Conference on Oilfield Chemistry, Apr. 3-5, 2017, 25 pages.
Selvin et al., "Principles and biophysical applications of lanthanide-based probes," Annual Review of Biophysics and Biomolecular Structure, Jun. 2002, 28 pages.
Sepulveda et al., "Oil-Based Foam and Proper Underbalanced-Drilling Practices Improve Drilling Efficiency in a Deep Gulf Coast Well," SPE 115536, presented at the 2008 SPE Annual Technical Conference and Exhibition in Denver, Colorado, Sep. 21-24, 2008, 8 pages.
Serra, "No Pressure Transient Analysis Methods for Naturally Fractured Reservoirs (includes associated papers 12940 and 13014)," Journal of Petroleum Technology, vol. 35, Issue 12, Society of Petroleum Engineers, Dec. 1983, 2 pages, Abstract.
Serres-Piole et al., "Water tracers in oilfield applications: Guidelines," Elsevier Ltd., Journal of Science and Engineering, Nov. 2012, 18 pages.
Shahid et al., "Natural-fracture reactivation in shale gas reservoir and resulting microseismicity," Journal of Canadian Petroleum Technology vol. 54.06, 2015.
Shin et al., "Development and Testing of Microcompression for Post Irradiation Characterization of ODS Steels," J. Nuclear Materials, published in 2014, 6 pages.
Shook et al., "SPE 124614: Determining Reservoir Properties and Flood Performance from Tracer Test Analysis," Society of petroleum Engineers (SPE), presented at SPE Annual Technical Conference and Exhibition, Oct. 4-7, 2009, 19 pages.
Shukla et al., "ARMA 13-578: Nanoindentation Studies on Shales," ARMA, presented at the 47th US Rock Mechanics/Geomechanics Symposium, Jun. 23-26, 2013, 10 pages.
Sierra et al., "Woodford Shale Mechanical Properties and the Impacts of Lithofacies," ARMA 10-461, copyright 2010, 10 pages.
Singh et al., "Facies classification based on seismic waveform," presented at the 5th Conference & Exposition on Petroleum Geophysics, Jan. 15-17, 2004, 7 pages.
Siskin et al., "Reactivity of organic compounds in hot water: geochemical and technological implications," Science, Oct. 11, 1991, 8 pages.
Slatt et al., "Merging Sequence Stratigraphy and Geomechanics for Unconventional Gas Shales," The Leading Edge, Mar. 2011, 8 pages.
Slatt et al., "Outcrop/Behind Outcrop (Quarry), Multiscale Characterization of the Woodford Gas Shale," copyright 2011, 22 pages.
Sone et al., "Mechanical properties of shale-gas reservoir rocks—Part 1: Static and Dynamic Elastic Properties and Anisotropy," Geophysics, vol. 78, No. 5, Sep.-Oct. 2013, 12 pages.
Sone et al., "Mechanical properties of shale-gas reservoir rocks—Part 2: Ductile creep, brittle strength, and their relation to the elastic modulus," 2013, Geophysics, vol. 78, No. 5, 10 pages.
Song et al., "SERS-Encoded Nanogapped Plasmonic Nanoparticles: Growth of Metallic Nanoshell by Templating Redox-Active Polymer Brushes," Journal of the American Chemical Society (JACS), Apr. 28, 2014, 4 pages.
Soni, "LPG-Based Fracturing: An Alternative Fracturing Technique in Shale Reservoirs," IADC/SPE-170542-MS, IADC/SPE Asia Pacific Drilling Technology Conference, Aug. 25-27, 2014, 7 pages.
Stiles et al., "Surface-enhanced Raman Spectroscopty," Annual Review of Analytical Chemistry, Mar. 18, 2008, 29 pages.
Tabatabaei et al., "Well performance diagnosis with temperature profile measurements," in SPE Annual Technical Conference and Exhibition, Society of Petroleum Engineers, Oct. 30-Nov. 2, 2011, published Jan. 2011, 16 pages.
Tian et al., "Off-Resonant Gold Superstructures as Ultrabright Minimally Invasive Surface-Enhanced Raman Scattering (SERS) Probes," American Chemical Society, Jul. 2015, 7 pages.
Ulboldi et al., "Rock strength measurement on cuttings as input data for optimizing drill bit selection," SPE 56441, presented at the 1999 SPE Annual Technical Conference and Exhibition in Houston, Texas, Oct. 3-6, 1999, 9 pages.
Uleberg and Kleppe, "Dual Porosity, Dual Permeability Formulation for Fractured Reservoir Simulation," Combined Gas/Water Injection Subprogram, 1996, 12 pages.
Ulm et al., "Material Invariant Poromechanics Properties of Shales," published in 2005, 8 pages.
Ulm et al., "The Nanogranular Nature of Shale," Acta Geotechnica, published in 2006, 12 pages.
Vanlandingham, "Review of Instrumented Indentation," Journal of Research of the National Institute of Standards and Technology, vol. 108, No. 4, Jul.-Aug. 2003; 17 pages.
Vernik et al., "Ultrasonic Velocity and Anisotropy of Hydrocarbon Source Rocks," Geophysics, vol. 57, No. 5, May 1992, 9 pages.
Walters et al., "Kinetic rheology of hydraulic fracturing fluids." SPE Annual Technical Conference and Exhibition. Society of Petroleum Engineers, Sep. 2001.
Wang et al., "A Feasibility Analysis on Shale Gas Exploitation with Supercritical Carbon Dioxide," Energy Sources, Part A: Recovery, Utilization and Environmental Effects, vol. 34, No. 15, 2012.
Wang et al., "A Numerical Study of Factors Affecting the Characterization of Nanoindentation on Silicon," Materials Science and Engineering: A, vol. 447, No. 1, Feb. 25, 2007; 10 pages.
Wang et al., "Iron Sulfide Scale Dissolvers: How Effective Are They?", SPE 168063, Society of Petroleum Engineers, presented at the SPE Saudi Arabia section Annual Technical Symposium and Exhibition, May 19-22, 2013, 22 pages.
Wang et al., "The Flattened Brazilian Disc Specimen Used for Testing Elastic Modulus, Tensile Strength and Fracture Toughness of Brittle Rocks: Analytical and Numerical Results," International Journal of Rock Mechanics and Mining Sciences, vol. 41, Issue 2: pp. 245-253.
Warpinski, "Understanding Hydraulic Fracture Growth, Effectiveness, and Safety Through Microseismic Monitoring," Intech, May 17, 2013, 14 pages.
Warren and Root, "The Behavior of Naturally Fractured Reservoirs," SPE Journal, vol. 3, No. 3, pp. 245-255, Sep. 1963, 11 pages.
Wegst et al., "Bioinspired structural materials," Nature Materials, vol. 14, Jan. 2015, 14 pages.

(56) References Cited

OTHER PUBLICATIONS

Wenk et al., "Preferred Orientation and Elastic Anisotropy of Illite-Rich Shale," Geophysics, vol. 72, No. 2, Mar.-Apr. 2007, 7 pages.

Wessels et al., "Identifying fault activation during hydraulic stimulation in the Barnett shale: source mechanisms, b values, and energy release analyses of microseismicity," presented at the SEG San Antonio 2011 Annual Meeting, Sep. 18-23, 2011, 5 pages.

Wilson and Aifantis, "On the Theory of Consolidation with Double Porosity," International Journal of Engineering Science, vol. 20, No. 9, 1982, 27 pages.

Wilson et al., "Fracture testing of bulk silicon microcantilever beams subjected to a side load," Journal of Microelectromechanical Systems, vol. 5, No. 3, Sep. 1996; 9 pages.

Wu et al., "A reusable biosensor chip for SERS-fluorescence dual mode immunoassay," Proc. SPIE 9543, Third International Symposium on Laser Interaction with Matter, 954317, May 4, 2015, 6 pages.

Wu et al., "A SERS-Assisted 3D Barcode Chip for High-Throughput Biosensing," Small Journal vol. 11, No. 23, Jun. 11, 2015, 9 pages.

Wurster et al., "Characterization of the fracture toughness of microsized tungsten single crystal notched specimens," Philosophical Magazine, vol. 92, No. 14, May 2012; 23 pages.

Wurzenberger et al., "Nitrogen-Rich Copper(II) Bromate Complexes: an Exotic Class of Primary Explosives," Journal of Inorganic Chemistry, vol. 57, 2018, 10 pages.

Xu et al., "Anisotropic elasticity of jarosite: A high-P synchrotron XRD study," American Mineralogist, vol. 95, Issue 1, 2010, 5 pages.

Xu et al . . . , "Measurement of two-photon excitation cross sections of molecular fluorophores with data from 690 to 1050 nm," Journal of the Optical Society of America B, Mar. 1996, 11 pages.

Yang et al., "Nanoscale geochemical and geomechanical characterization of organic matter in shale," Nature Communications, vol. 8, 2179, Dec. 19, 2017, 9 pages.

Zamberi et al., "SPE 166005: Improved Reservoir Surveillance Through Injected Tracers in a Saudi Arabian Field: Case Study," Society of Petroleum Engineers (SPE), presented at SPE Reservoir Characterization and Simulation Conference and Exhibition, Sep. 16-18, 2013, 15 pages.

Zemel, "Chapter 3: Interwell Water Tracers," Tracers in the Oil Field, vol. 43, 1st Edition, Elsevier Science, Jan. 13, 1995, 47 pages.

Zeszotarski et al., "Imaging and Mechanical Property Measurements of Kerogen via Nanoindentation," Geochimica et Cosmochimica Acta, vol. 68, No. 20, Oct. 15, 2004, 7 pages.

Zhou et al., "Upconversion luminescent materials: advances and applications," Chem Rev., Jan. 14, 2015, 71 pages.

Zielinski et al., "A Small-Angle Neutron Scattering Study of Water in Carbon Dioxide Microemulsions," Langmuir 1997, 13(15), pp. 3934-3937, 4 pages.

Zimmerman and Bodvarsson, "Hydraulic Conductivity of Rock Fractures," transport in Porous Media, vol. 23, Jan. 1996, 31 pages.

Tiab et al., "Petrophysics: Theory and Practice of Measuring Reservoir Rock and Fluid Transport Properties," Elsevier, Inc., Januaty 2004, XP040425459, 180-185, 540-548, 928 pages.

Ahmed et al., "Advances Reservoir Engineering," Elsevier, Inc., Jan. 2005, XP040426076, 72-80, 421 pages.

Ehlig-Economides and Economides, "Guidelines Simplify Well Test Interpretation," Oil and Gas Journal, Jul. 1994, 92(29): 33-40, XP000465818, 8 pages.

Xiao et al., "A Novel Approach to Detect Interacting Behavior Between Hydraulic Fracture and Natural Fracture by Use of SenniAnalytical Pressure-Transient Model," SPE Journal, Dec. 2017, 1834-1855.

One Petro Search Results, May 3, 2021, 1-5.

PCT International Search Report and Written Opinion in International Appln. No. PCT/US2021/03671, dated May 11, 2021, 12 pages.

\* cited by examiner

ESTIMATING NATURAL FRACTURE PROPERTIES BASED ON PRODUCTION FROM HYDRAULICALLY FRACTURED WELLS

CROSS-REFERENCE TO RELATED PATENT APPLICATIONS

This application is a continuation of and claims the benefit of priority to U.S. patent application Ser. No. 16/746,016, filed Jan. 17, 2020, the contents of which are incorporated by reference herein.

TECHNICAL FIELD

This disclosure relates to evaluating naturally fractured hydrocarbon reservoirs and using results of the evaluation to produce hydrocarbons from such reservoirs.

BACKGROUND

A naturally fractured hydrocarbon reservoir is one in which fractures are created by geological processes. Such fractures impact the migration, storage, and extraction of hydrocarbons entrapped in the reservoir. Hydrocarbon extraction processes, such as, drilling and weight design, hydraulic fracturing design, hydrocarbon production optimization, to name a few, are impacted by properties of the natural fractures. Such properties can be determined through wellbore pressure analysis for data from well tests and production. Whereas techniques to estimate properties of intact rocks have been well developed, the estimation of properties of fractures for naturally fractured reservoirs is complex.

SUMMARY

This disclosure describes technologies relating to estimating natural fracture properties based on production from hydraulically fractured wells.

Certain aspects of the subject matter described here can be implemented as a computer-implemented method. A computer system receives hydrocarbon reservoir production information associated with a naturally fractured hydrocarbon reservoir with entrapped hydrocarbons in which a wellbore has been formed to produce the hydrocarbons. The information includes a wellbore pressure measured over production time. From the wellbore pressure measured over the production time, the computer system determines a time rate of change of the wellbore pressure over the production time. From a plot of a logarithmic time rate of change of the wellbore pressure over logarithmic production time, the computer system identifies multiple plot sections. Each plot section represents a respective flow regime of a flow of the hydrocarbons from the reservoir. For each plot section, the computer system determines a corresponding time rate of change of the wellbore pressure intersect value. The computer system determines a reservoir parameter for each corresponding time rate of change of the wellbore pressure intersect value determined for each plot section.

An aspect combinable with any of the other aspects includes the following features. The information includes production rate, pressure at standard conditions, temperature at standard conditions, thickness of formation in which the wellbore is formed, radius of the wellbore, hydrocarbon viscosity, reservoir temperature, and reservoir porosity and compressibility.

An aspect combinable with any of the other aspects includes the following features. The multiple plot sections include a pseudo-radial plot section having a slope of substantially zero. To determine the time rate of change of the wellbore pressure intersect value for the pseudo-radial plot section, an intersect value of the pseudo-radial plot section on the plot is identified.

An aspect combinable with any of the other aspects includes the following features. The reservoir parameter for the pseudo-radial plot section is fracture permeability of the reservoir. The fracture permeability is determined by computationally solving equations described in this disclosure.

An aspect combinable with any of the other aspects includes the following features. The multiple plot sections include a pseudo-steady state section having a slope of substantially +1. To determine the time rate of change of the wellbore pressure intersect value for the pseudo-steady state plot section, an intersect value of the pseudo-steady state plot section on the plot is determined.

An aspect combinable with any of the other aspects includes the following features. The reservoir parameter for the pseudo-steady state plot section is matrix permeability of the reservoir. The matrix permeability is determined by computationally solving equations described in this disclosure.

An aspect combinable with any of the other aspects includes the following features. The multiple plot sections include a trough in the time rate of change of the wellbore pressure over logarithmic production time. To determine the time rate of change of the wellbore pressure intersect value for the trough, an intersect value of the trough of the plot is determined.

An aspect combinable with any of the other aspects includes the following features. The trough includes a high point and a low point, each being an intersect value. A difference between the high point and the low point is a time rate of change of pressure of the trough.

An aspect combinable with any of the other aspects includes the following features. The reservoir parameter for the trough is fracture storage. The fracture storage is determined by computationally solving equations described in this disclosure.

An aspect combinable with any of the other aspects includes the following features. The multiple plot sections include a pseudo-linear plot section having a slope of substantially +½. To determine the time rate of change of the wellbore pressure intersect value for the pseudo-linear plot section, an intersect value of the pseudo-linear plot section on the plot is determined.

An aspect combinable with any of the other aspects includes the following features. The reservoir parameter is hydraulic fracture half length. The hydraulic fracture half length is determined by computationally solving equations described in this disclosure.

An aspect combinable with any of the other aspects includes the following features. The plot of the time rate of change of the wellbore pressure over the logarithmic production time is generated.

Certain aspects of the subject matter described here can be implemented as a computer-readable medium (for example, a non-transitory, computer-readable medium) storing instructions executable by a computer system to perform operations described in this disclosure.

Certain aspects of the subject matter described here can be implemented as a computer system. The computer system includes one or more processors and a computer-readable storage medium (for example, a non-transitory, computer-readable storage medium) coupled to the one or more processors. The medium stores programming instructions for execution by the one or more processors. The programming instructions instructing the one or more processors to perform operations described in this disclosure.

The previously described implementation is implementable using a computer-implemented method; a non-transitory, computer-readable medium storing computer-readable instructions to perform the computer-implemented method; and a computer-implemented system including a computer memory interoperably coupled with a hardware processor configured to perform the computer-implemented method or to execute the instructions stored on the non-transitory, computer-readable medium.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Certain methods for determination of properties of natural fractures in hydrocarbon reservoirs depend on idealized dual-porosity models. Such models assume that the fractures consist of an orthogonal system. In the model, rock matrix and natural fractures play the role of storage and conduction, respectively. There is fluid communication between the matrix and the fractures but not flow in the rock matrix. Such a model is weakly representative of natural fractures due to its assumption of ideal geometry on natural fractures. Such a model also neglects the fluid flow in the rock matrix, which makes the estimations unreliable when investigating naturally fractured unconventional rocks which have relatively high permeability. Studies have shown that, even for some cases of unconventional rocks, the fluid flow in the matrix plays a role in such pressure analysis.

This disclosure describes implementing the dual-porosity, dual-permeability model that accounts for both matrix and fracture flows to analyze wellbore gas potential response during production from a hydraulically fractured well in a naturally fractured formation. Wellbore gas potential is equivalent to wellbore gas pressure. Wellbore gas potential is calculated from wellbore gas pressure using Equation (4) provided later. Wellbore gas pressure can be measured using a pressure gauge. As described later, an analytical solution of wellbore gas potential response during a constant rate of production from a hydraulically fractured wellbore in a naturally-fractured and cylindrically-bounded formation is derived. The analytical solution accounts for both matrix and fracture flows into the wellbore. Curves of wellbore gas potential over time are analyzed. The analysis identifies multiple flow regimes represented by pseudo-linear, pseudo-radial, pseudo-steady state portions, and a trough having a trough base and a trough height. Matrix and fracture permeability together with inter-porosity flow coefficient are computationally determined from analytical equations representing the multiple flow regimes.

Figure 1:
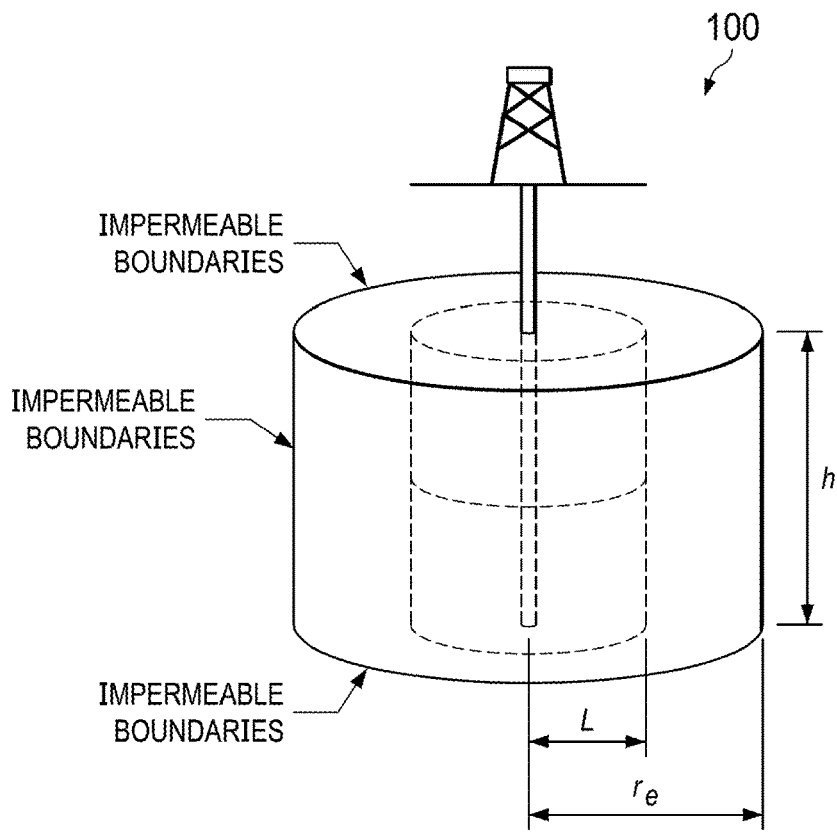
FIG. 1 is a schematic of a hydraulic fracture in a cylindrically-bounded formation.

FIG. 1 is a schematic 100 of a hydraulic fracture in a cylindrically-bounded formation. The analytical solution of wellbore gas potential response described in this disclosure is derived for a hydraulically fractured vertical wellbore under a constant rate of production from a cylindrically-bounded and naturally fractured formation, as shown in the schematic 100. The analytical solution accounts for gas flows into the wellbore from both matrix and fracture in the reservoir rock. The multiple flow regimes are identified by slopes of the curves in the time-history plot of the wellbore gas potential derivative. In particular, the pseudo-linear, pseudo-radial, and pseudo-steady state flow regimes are identified by the slopes. +½, 0, and +1, respectively. The analytical solutions further characterize such sloped behaviors allowing determination of reservoir properties such as rock matrix permeability, fracture permeability, and hydraulic fracture length. Some transient behavior, characterized by a trough of the gas potential derivative curve between the pseudo-linear and the pseudo-radial regimes is also investigated. Analytical expressions for the height of the trough and the time marker of the trough base are determined to estimate fracture storage and inter-porosity flow coefficient representing inter-porosity flow between the matrix and the fracture.

Figure 2:
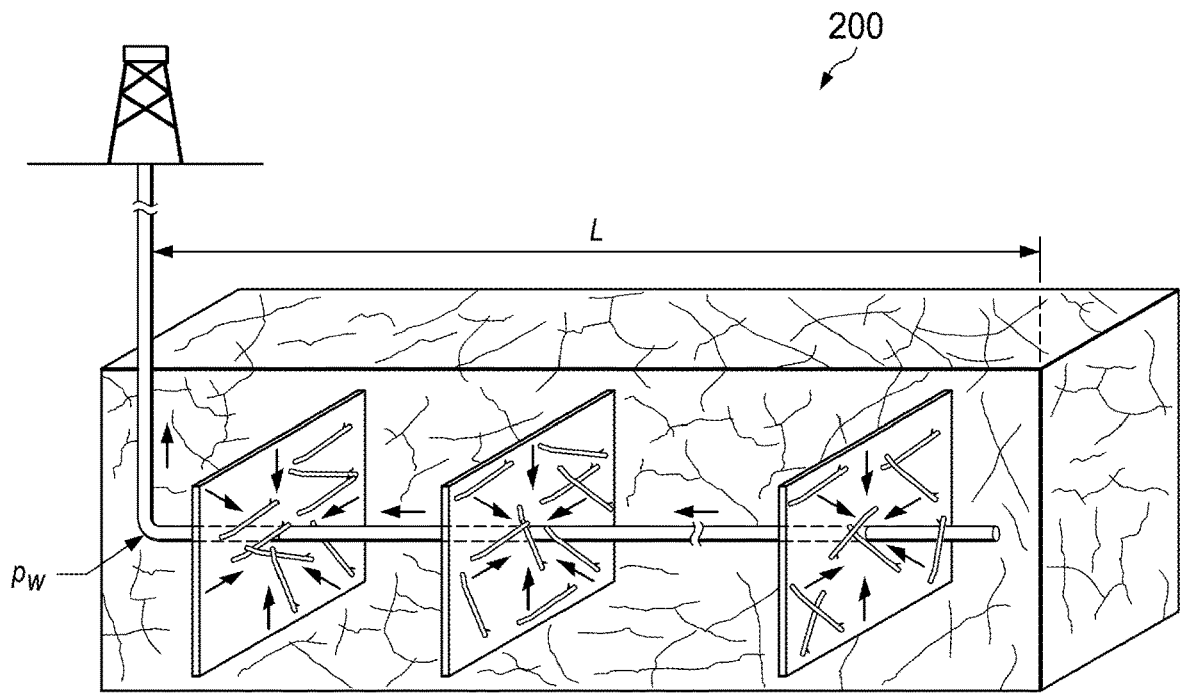
FIG. 2 is a schematic of production from a horizontal wellbore with multi-stage hydraulic fractures.

FIG. 2 is a schematic 200 of production from a horizontal wellbore with multi-stage hydraulic fractures. The techniques to extract formation properties can also be applied for the analysis of production from a horizontal wellbore with the multi-stage hydraulic fractures, as shown in schematic 200. To apply the techniques for a hydraulically fractured horizontal wellbore, each hydraulic fracture is treated as a plane source. The analytical solutions described here are computationally implemented to calculate the wellbore pressure. Similarly, corresponding slope analysis is applied and the explicit equations are computationally solved to calculate formation properties. In some implementations, the techniques to determine formation properties based on the slope analyses and computational solutions of the analytical equations described here can be displayed on a display platform.

In the following paragraphs, the development of the analytical equations for the dual-porosity, dual-permeability model are described. Application of the analytical equations to determine the formation properties are then described. As described later, application of the analytical equations includes computationally solving the equations using input parameters by a computer system such as the one described with reference to FIG. 5.

The dual-pressure governing equations for the original dual-continual theory for a homogenous and isotropic fractured porous medium is expressed in Equation (1).

$$A' \frac{\partial}{\partial t} \begin{bmatrix} p^I \\ p^{II} \end{bmatrix} = D' \nabla^2 \begin{bmatrix} p^I \\ p^{II} \end{bmatrix} + \Gamma' \begin{bmatrix} p^I \\ p^{II} \end{bmatrix} \quad (1)$$

In Equation (1), $$A' = \begin{bmatrix} \phi^I C_t^I & -\beta_* \\ -\beta_{**} & \phi^{II} C_t^{II} \end{bmatrix}; \quad D' = \begin{bmatrix} \dfrac{k^I}{\mu} & 0 \\ 0 & \dfrac{k^{II}}{\mu} \end{bmatrix}; \quad \Gamma' \dfrac{\alpha}{\mu} \begin{bmatrix} -1 & 1 \\ 1 & -1 \end{bmatrix} \quad (2)$$

I and II stand for matrix and fracture, respectively; $\phi C_t$ is storage, k is permeability, $\mu$ is viscosity, $\alpha$ is a characteristic of the fractured porous medium, $\beta_*$ is a coefficient relating fracture-pressure variation on matrix-porosity radiation. and $\beta_{**}$ is a coefficient relating matrix-pressure variation on fracture-porosity radiation. $\beta_*$ and $\beta_{**}$ are usually small and can be neglected.

Equation (1) is the governing equation for poor pressure in oil formations. For gas wells, the gas potential rather than poor pressure is investigated. The governing equations for gas potential have the same form as Equation 1. Therefore, neglecting the terms $\beta_*$ and $\beta_{**}$ in Equation 1 and expressing Equation 1 in terms of gas potential results in Equation 3.

$$D \dfrac{\partial}{\partial t} \begin{bmatrix} m(p^I) \\ m(p^{II}) \end{bmatrix} = \nabla^2 \begin{bmatrix} m(p^I) \\ m(p^{II}) \end{bmatrix} + \Gamma \begin{bmatrix} m(p^I) \\ m(p^{II}) \end{bmatrix} \quad (3)$$

In Equation 3, m(p) is the gas potential defined by Equation 4.

$$m(p) = 2 \int_{p_0}^{p} \dfrac{p}{\mu Z} dp \quad (4)$$

In Equation (4), $p_0$ is the initial gas pressure, p is the wellbore gas pressure, $\mu$ is the viscosity, Z is the gas compressibility factor, and the matrix D and $\Gamma$ are defined by Equation 5.

$$D = \begin{bmatrix} \dfrac{\mu \phi^I C_t^I}{k^I} & 0 \\ 0 & \dfrac{\mu \phi^{II} C_t^{II}}{k^{II}} \end{bmatrix}; \quad \Gamma = \lambda \begin{bmatrix} -1 & 1 \\ 1 & -1 \end{bmatrix} \quad (5)$$

For the governing equation, Equation (3), the coefficients matrix shown in Equation (5) could be pressure- and time-dependent. In this disclosure, the coefficients are treated as constants or average values throughout the wellbore production.

It can be seen that the matrix flow is considered and coupled with fracture flow through the inter-porosity flow camp. Consequently, the equations presented so far represent an improvement over certain other studies of the problem of production from hydraulically-fractured wells in a naturally fractured formation. In such studies, matrix flow was not considered, or the matrix flow was not coupled with the fracture flow.

The analytical solutions that follow are related to the response of wellbore pressure during production from a hydraulically and naturally fractured vertical wellbore. To derive the analytical solutions of wellbore gas potential, the hydraulic fracture is assumed to be symmetric with respect to the wellbore. Pressure difference along the vertical direction in the created fracture is ignored to allow for two-dimensional analysis. A horizontal plane is considered in the formation. The wellbore gas potential is simulated by a finite-line source solution, that is, the wellbore gas potential at the middle point of a finite-line source with a constant rate of production. The line source solution is obtained by integrating the point source solutions along the hydraulic fracture length. Derivation of the point source solution is described with reference to some of the following equations.

Initially, the dual-porosity, dual-permeability system is assumed to be in equilibrium with uniform formation pressure, that is, $p^I$ (pore pressure in rock matrix)=$p^{II}$ (pore pressure in fractures)=$p_0$ (initial pore pressure). Application of Laplace transform to Equation (3) provides Equation (6).

$$sD \begin{bmatrix} \tilde{m}(p^I) \\ \tilde{m}(p^{II}) \end{bmatrix} = \nabla^2 \begin{bmatrix} \tilde{m}(p^I) \\ \tilde{m}(p^{II}) \end{bmatrix} + \Gamma \begin{bmatrix} \tilde{m}(p^I) \\ \tilde{m}(p^{II}) \end{bmatrix} \quad (6)$$

Equation (6) can also be expressed as Equation (7).

$$\nabla^2 \begin{bmatrix} \tilde{m}(p^I) \\ \tilde{m}(p^{II}) \end{bmatrix} = (sD - \Gamma) \begin{bmatrix} \tilde{m}(p^I) \\ \tilde{m}(p^{II}) \end{bmatrix} \quad (7)$$

For the cylindrically-bounded formation shown in schematic 100, the general solutions of Equations (6) and (7) can be obtained and written in the matrix form shown in Equation (8).

$$\begin{Bmatrix} \tilde{m}(p_{point}^I) \\ \tilde{m}(p_{point}^{II}) \end{Bmatrix} = P \begin{bmatrix} C_1^I K_0(\sqrt{\lambda^I} r) + C_2^I I_0(\sqrt{\lambda^I} r) \\ C_1^{II} K_0(\sqrt{\lambda^{II}} r) + C_2^{II} I_0(\sqrt{\lambda^{II}} r) \end{bmatrix} \quad (8)$$

In Equation (8), $I_0(x)$ and $K_0(x)$ are the modified Bessel function of the first and second kind, respectively; $C_1^I$, $C_2^I$, $C_1^{II}$, and $C_2^{II}$ are coefficients to be determined by the boundary conditions. The matrix P satisfies the condition shown in Equation (9).

$$P^{-1}(sD - \Gamma)P = \begin{bmatrix} \lambda^I & 0 \\ 0 & \lambda^{II} \end{bmatrix} \quad (9)$$

The matrix P is denoted by the matrix shown in Equation (10).

$$P = \begin{bmatrix} m_{11}^I & m_{12}^{II} \\ m_{21}^I & m_{22}^{II} \end{bmatrix} \quad (10)$$

The boundary conditions for this problem are expressed explicitly as follows.

At $r=r_e$, it is a no-flow boundary represented by Equation (11). Here, $r_e$ refers to the radius of the wellbore in the hydrocarbon reservoir.

$$\left. \dfrac{\partial \tilde{m}(p_{point}^I)}{\partial r} \right|_{r=r_e} = \left. \dfrac{\partial \tilde{m}(p_{point}^{II})}{\partial r} \right|_{r=r_e} = 0 \quad (11)$$

At the center of the wellbore, that is, r=0, it is a constant rate of production boundary, as represented by Equation (12).

$$\lim_{r \to 0} 2\pi r \left( \frac{k^I}{\mu} \frac{\partial p_{point}^I}{\partial r} + \frac{k^{II}}{\mu} \frac{\partial p_{point}^{II}}{\partial r} \right) h = -Bq_w \quad (12)$$

In Equation (12), production from both matrix and fracture are considered.

To express the above boundary conditions at the wellbore in the form of gas potential, i.e., m(p), the approximation shown in Equation (13) can be utilized.

$$m(p) = 2 \int_{p_0}^{p} \frac{p}{\mu Z} dp \approx \frac{2p}{\mu Z}(p - p_0) \quad (13)$$

Substitution of Equation (13) with the gas volume factor, $B = Tp_{sc}Z/T_{sc}p$, into Equation (12) provides Equation (14).

$$\lim_{r \to 0} \left( k^I r \frac{\partial m(p_{point}^I)}{\partial r} + k^{II} r \frac{\partial m(p_{point}^{II})}{\partial r} \right) = -\frac{q_w T p_{sc}}{\pi h T_{sc}} \quad (14)$$

In Equation (14), T is formation temperature, $T_{sc}$ (=288.7 K) and $p_{sc}$ (=101.3 kPa) are the temperature and pressure at standard conditions, respectively.

For the propped hydraulic fracture, another boundary condition involves the gas potential along the hydraulic fracture length. Assuming that the width of the hydraulic fracture is 2w, then, at the fracture surface, the matrix gas potential equals the fracture gas potential as represented in Equation (15).

$$\text{at } r=w: \ m(p_{point}^I) = m(p_{point}^I) \quad (15)$$

Substituting Equation (8) into Equations (11), (14), and (15) yields Equations (16), (17), (18), and (19).

$$-C_1^I m_{11}^I \sqrt{\lambda^I} K_1(\sqrt{\lambda^I} r_e) + C_2^I m_{11}^I \sqrt{\lambda^I} I_1(\sqrt{\lambda^I} r_e) - \\ C_1^{II} m_{12}^{II} \sqrt{\lambda^{II}} K_1(\sqrt{\lambda^{II}} r_e) + C_2^{II} m_{12}^{II} \sqrt{\lambda^{II}} I_1(\sqrt{\lambda^{II}} r_e) = 0 \quad (16)$$

$$-C_1^I m_{21}^I \sqrt{\lambda^I} K_1(\sqrt{\lambda^I} r_e) + C_2^I m_{21}^I \sqrt{\lambda^I} I_1(\sqrt{\lambda^I} r_e) - \\ C_1^{II} m_{22}^{II} \sqrt{\lambda^{II}} K_1(\sqrt{\lambda^{II}} r_e) + C_2^{II} m_{22}^{II} \sqrt{\lambda^{II}} I_1(\sqrt{\lambda^{II}} r_e) = 0 \quad (17)$$

$$k^I(C_1^I m_{11}^I + C_1^{II} m_{12}^{II}) + k^{II}(C_1^I m_{21}^I + C_1^{II} m_{22}^{II}) = \frac{q_w T p_{sc}}{\pi h T_{sc}} \quad (18)$$

$$C_1^I(m_{11}^I - m_{21}^I) K_0(\sqrt{\lambda^I} w) + C_2^I(m_{11}^I - m_{21}^I) I_0(\sqrt{\lambda^I} w) + \\ C_1^{II}(m_{12}^{II} - m_{22}^{II}) K_0(\sqrt{\lambda^{II}} w) + C_2^{II}(m_{12}^{II} - m_{22}^{II}) I_0(\sqrt{\lambda^{II}} w) = 0 \quad (19)$$

The coefficients $C_1^I$, $C_2^I$, $C_1^{II}$, and $C_2^{II}$ can be determined by solving the above for linear regressions.

For a hydraulic fracture with length of 2L, the line source solutions for the wellbore gas potential can be obtained by integrating the point source solutions along the fracture length and expressed as shown in Equation (2).

$$\begin{bmatrix} m(\bar{p}_w^I) \\ m(\bar{p}_w^{II}) \end{bmatrix} = \frac{1}{2L} \int_{-L}^{L} P \begin{bmatrix} C_1^I K_0(\sqrt{\lambda^I} r) + C_2^I I_0(\sqrt{\lambda^I} r) \\ C_1^{II} K_0(\sqrt{\lambda^{II}} r) + C_2^{II} I_0(\sqrt{\lambda^{II}} r) \end{bmatrix} dr \quad (20)$$

The analytical solutions that follow are related to the response of wellbore pressure during production from a hydraulically and naturally fractured horizontal wellbore. For a hydraulically fractured horizontal wellbore with multistage hydraulic fractures, it can be reasonably assumed that the horizontal wellbore has infinite hydraulic conductivity. That is, the wellbore pressure is identical at each hydraulic fracture mouth. The total production is a summation of the production from each individual hydraulic fracture. Such assumption yields Equations (21) and (22).

$$p_w = p_1 = \ldots = p_N \quad (21)$$

$$q = \Sigma_{i=1}^{N} q_i \quad (22)$$

In Equations (21) and (22), N is the number of hydraulic fractures, $p_w$ is the wellbore pressure, $p_i$ is the wellbore pressure at each hydraulic fracture mouth, q is the total production rate, and $q_i$ is the production rate from the $i^{th}$ hydraulic fracture.

For each hydraulic fracture, the general solution of Equation (2) is obtained. Substitution of these equations into the conditions of Equations (21) and (22) allows calculating the coefficients $C_{1i}^I$, $C_{2i}^I$, $C_{1i}^{II}$, and $C_{2i}^{II}$ for each hydraulic fracture. As a result, the wellbore pressure during the production from a horizontal wellbore with N hydraulic fractures is obtained.

The analytical equations that follow are related to determination of slopes and the application of the slope analysis to estimate formation properties. In some implementations, the slope analysis can be implemented using a computer system such as the computer system described later, with reference to FIG. 5. As a first step, parameters associated with the naturally fractured hydraulic reservoir are collected and provided as input to the computer system. In some implementations, the parameters include permeability [k (mD)], storage [$\phi C_t$ (1/GPa)], viscosity [$\mu$/(cP)], gas volume factor [B (m$^3$/Sm$^3$)], gas compressibility factor [Z], and inter-porosity flow coefficient [$\lambda$]. Gas compressibility factor is a dimensionless variable. Inter-porosity flow coefficient has the units Pa$^{-1}$s$^{-1}$. Other parameters include flow rate [$q_w$ (m$^3$/d)], temperature [T (° C.)], formation thickness [h (cm)], fracture half-length [L (m)], and formation radius [$r_e$ (m)]. For a dual-porosity, dual-permeability naturally fractured formation fracture, poor pressure at the wellbore tends to be more representative of the wellbore pressure due to its higher ability compared to the matrix system to communicate with the wellbore. Using these parameters associated with a constant rate of gas production from a naturally fractured formation, the fracture gas potential at the wellbore is evaluated.

Figure 3A:
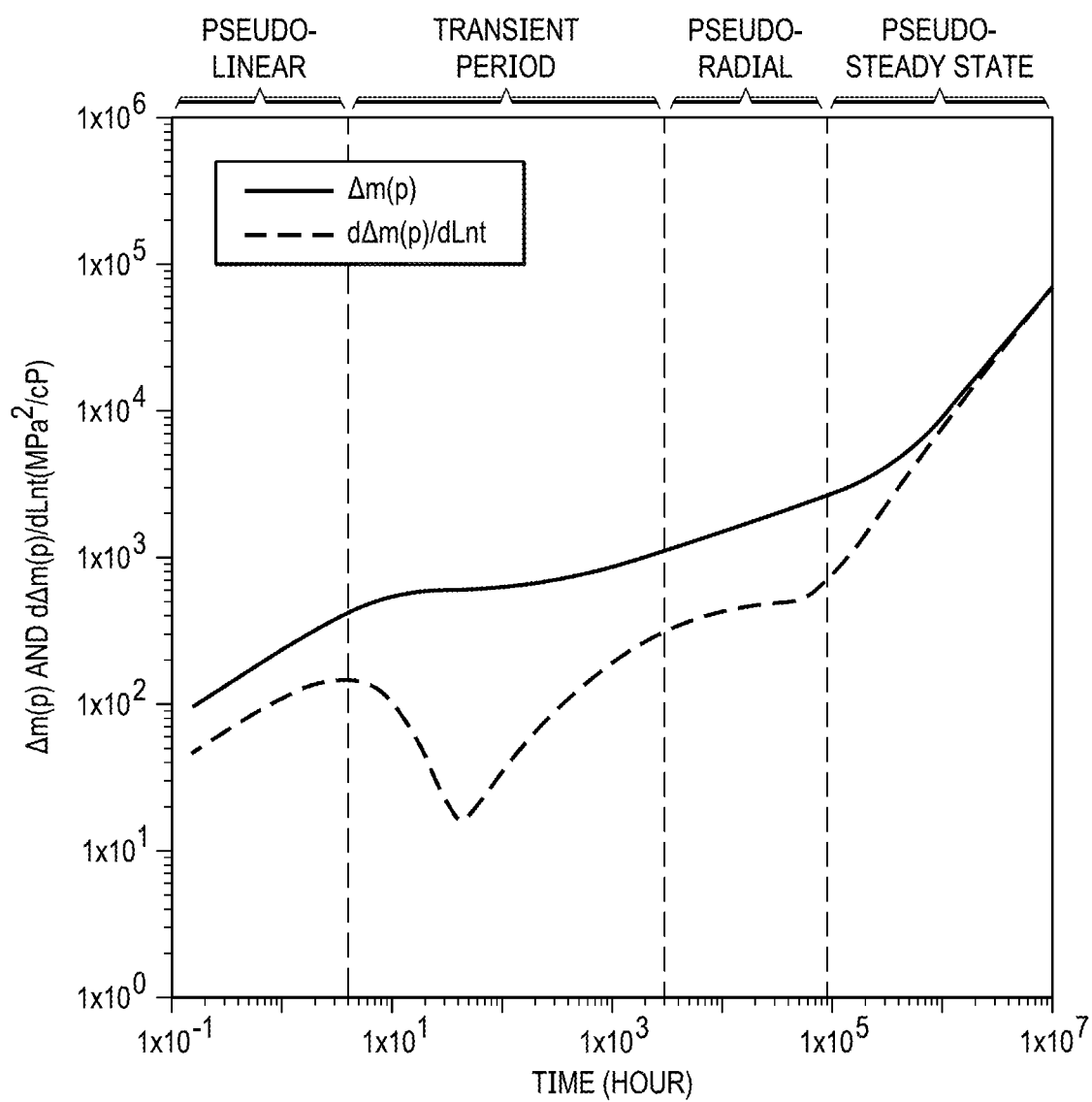
FIGS. 3A and 3B are plots of wellbore gas potential response during constant rate of production.
Figure 3B:
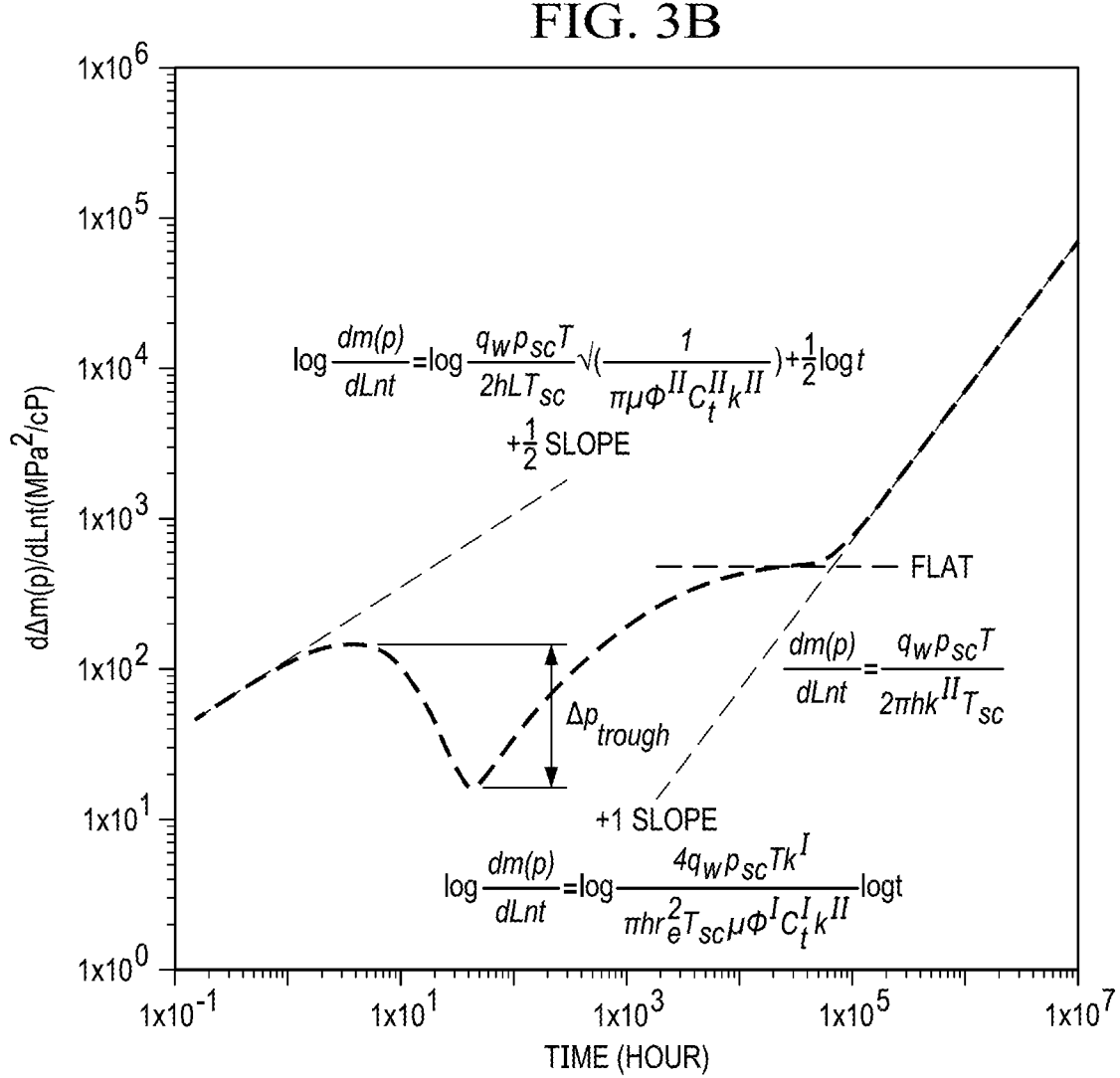

FIGS. 3A and 3B are plots of wellbore gas potential response during constant rate of production. In each of FIGS. 3A and 3B, the X-axis shows production time in the logarithmic scale. In the Y-axis, the solid line shows gas potential, and the dashed line shows time rate of change of gas potential, both in the logarithmic scale. In some implementations, the computer system receives the gas potential as a function of time. The computer system determines a time rate of change of the gas potential. The computer system converts the gas potential and the time rate of change of the gas potential into the logarithmic scale and plots the same over the production time, also in the logarithmic scale.

From the plots shown in FIG. 3A, the computer system identifies a pseudo-linear flow regime, a pseudo-radial flow regime, and a pseudo-steady state flow regime, which correspond to the slopes of +½, 0, and +1, respectively, in the gas potential derivative curve. In implementation, the computer system generates the gas potential derivative curve by connecting a sequence of discrete points. The computer system can determine slopes of the curve to identify the different flow regimes. To determine the slope, the computer system can identify any two points by their respective Cartesian coordinates ($x_1$, $y_1$ and $x_2$, $y_2$) and determine the slope of the line connecting the two points using the formula $$\frac{y_2 - y_1}{x_2 - x_1}.$$

Also, me transient period, which is dominated by the interporosity flow between matrix and fracture, is also obtained, as characterized by the behavior in the gas potential curve. FIG. 3B presents the equations of the three straight lines with the slopes of +½, 0, and +1 in the gas potential data curve. In some implementations, the plot portions that represent the respective flow regimes are not exactly straight, and the slopes are not exactly +½, 0, and +1. For example, the slopes are substantially +½, 0, and +1, which means that a deviation of ±5% from the exact value is permissible.

By applying sensitivity analysis and Buckingham π theorem, equations representing the straight lines were determined. The determination of these equations are described in the following paragraphs.

The +½ slope in the gas potential derivative curve is indicated by Equation (23).

$$At\ t \to 0: \frac{dm(p)}{dLnt} \to C_0 \sqrt{t} \quad (23)$$

In Equation (23), $C_o$ is a constant to be determined. The pseudo-linear flow is controlled by the following parameters—$k^{II}$, $\phi^{II}C_t^{II}$, L, h, $q_w$, T, and μ. That is, such parameters control the constant $C_o$. Applying the Buckingham π theorem, it is found that $C_o$ has the form shown in Equation (24).

$$C_0 = C_1 \left(\frac{q_w T}{hL}\right)(k^{II}\mu\phi^{II}C_t^{II})^{1/2} \quad (24)$$

In Equation (24), $C_1$ is another dimensionless constant. Further analysis on the gas potential solutions provides Equation (25).

$$C_0 = \frac{q_w T p_{sc}}{2hLT_{sc}} \sqrt{\frac{1}{\pi\mu\phi^{II}C_t^{II}k^{II}}} \quad (25)$$

therefore, the pseudo-linear flow has the asymptotic behavior shown by Equation (26).

$$At\ t \to 0: \frac{dm(p)}{dLnt} \to \frac{q_w T p_{sc}}{2hLT_{sc}} \sqrt{\frac{t}{\pi\mu\phi^{II}C_t^{II}k^{II}}} \quad (26)$$

Similar analysis can be applied to the pseudo-radial and pseudo-steady state flow regimes. Based on the analysis, it is found that the pseudo-radial flow has the asymptotic behavior shown by Equation (27).

$$\frac{dm(p)}{dLnt} \to \frac{q_w T p_{sc}}{2\pi h k^{II} T_{sc}} \quad (27)$$

The pseudo-steady state flow has the asymptomatic behavior shown by Equation (28).

$$At\ t \to \infty: \frac{dm(p)}{dLnt} \to \frac{4q_w T p_{sc} k^I t}{\pi h r_e^2 T_{sc} \mu \phi^I C_t^I k^{II}} \quad (28)$$

The depth of the trough in the gas potential derivative curve is also investigated. The trough is controlled by the term $k^{II}\phi C_t^I/k^I\phi^{II}C_t^{II}$. Since the quantity is dimensionless, it is reasonable to characterize the depth of the trough by a dimensionless quantity as well as to establish a relationship between the two. The depth of the trough is characterized as $(y_{max}-y_{min})/y_{max}$, where $y_{max}$ is the y-coordinate of the highest point of the left part of the trough, and $y_{min}$ is the y-coordinate of the lowest point of the trough. $y_{max}-y_{min}$ is the $\Delta p_{trough}$ as illustrated in FIG. 3B. As a result, the approximation shown in Equation (29) is found.

$$\frac{\Delta p_{trough}}{y_{max}} \approx \frac{Ln10}{2\pi} Log_{10} \frac{k^{II}\phi^I C_t^I}{k^I\phi^{II}C_t^{II}} \quad (29)$$

Equations (26)-(29) are used to estimate matrix permeability, fracture permeability, fracture storage, and hydraulic fracture length. To do so, the computer system identifies the flat-line behavior in the pseudo-radial flow regime (that is, the plot portion with a 0 slope) and identifies the intersect value ($y_i$) between the flat-line and the Y-axis of the plot shown in FIG. 3B. Equation (29) is then applied to estimate the fracture permeability as shown in Equation (30).

$$k^{II} = \frac{q_w T p_{sc}}{2\pi h T_{sc} y_i} \quad (30)$$

In sum, the computer system introduces the intersect value ($y_i$) into Equation (30) to solve for fracture permeability.

In some implementations, the computer system identifies the pseudo-steady state (that is, the plot portion with the +1 slope) to estimate matrix permeability. To do so, the computer system identifies the intersect value ($y_j$) on the Y-axis between the straight line of the unit slope with the t=1 axis. Equation (28) is then applied to estimate the matrix permeability as shown in Equation (31).

$$k^I = \frac{y_j \pi h r_e^2 T_{sc} \mu \phi^I C_t^I k^{II}}{4 q_w T p_{sc}} \quad (31)$$

Once matrix and fracture permeabilities are determined, the computer system determines fracture storage from Equation (29). To do so, the computer system identifies $y_{max}$ and $y_{min}$ for the trough, for example, from the plot in FIG. 3B. Subsequently, the computer system determines fracture storage using Equation (32).

$$\phi^{II} C_t^{II} = \frac{k^{II} \phi^I C_t^I}{k^I} 10^{-\frac{2\pi}{Ln10} \frac{\Delta P_{trough}}{y_{max}}} = 2.28/\text{Gpa} \quad (32)$$

Next, the computer system introduces the determined fracture permeability and fracture storage into Equation (26) to determine the hydraulic fracture half-length. To do so, the computer system identifies the intersect value ($y_k$) between the straight line of the +½ slope with the t=1 axis. Then, according to Equation (26), Equation (33) is obtained.

$$L = \frac{q_w T p_{sc}}{2hT_{sc} y_k} \sqrt{\frac{1}{\pi \mu \phi^{II} C_t^{II} k^{II}}} \quad (33)$$

In some implementations, if the fracture half-length is known, for example, through micro-seismic survey, the fracture storage can be estimated using Equation (33).

To summarize, the computer system computationally solves the equations shown in Table 1 to determine properties of naturally fractured hydrocarbon reservoirs carrying entrapped hydrocarbons, for example, oil or natural gas.

TABLE 1

Summary of equations to determine reservoir properties from flow regimes

| Flow Regimes | Asymptotic Behavior | | Slope |
|---|---|---|---|
| Pseudo-Linear | $\frac{dm(p)}{dLnt} \rightarrow \frac{q_w T p_{sc}}{2hLT_{sc}} \sqrt{\frac{t}{\pi \mu \phi^{II} C_t^I k^{II}}}$ | | +1/2 |
| Transient | Relative Height of Trough | $\frac{\Delta P_{trough}}{y_{max}} \approx \frac{Ln10}{2\pi} Log_{10} \frac{k^{II} \phi^I C_t^I}{k^I \phi^{II} C_t^{II}}$ | Trough |
| | Time Marker of the Trough Base | $t_D = \frac{\mu}{\pi \lambda} \sqrt{\frac{\phi^I \phi^{II} C_t^I C_t^{II}}{k^I k^{II}}}$ | |
| Pseudo-Radial | $\frac{dm(p)}{dLnt} \rightarrow \frac{q_w T p_{sc}}{2\pi h k^{II} T_{sc}}$ | | 0 |
| Pseudo-Steady State | $\frac{dm(p)}{dLnt} \rightarrow \frac{4q_w T p_{sc} k^I t}{\pi h r_e^2 T_{sc} \mu \phi^I C_t^I k^{II}}$ | | +1 |

Figure 4:
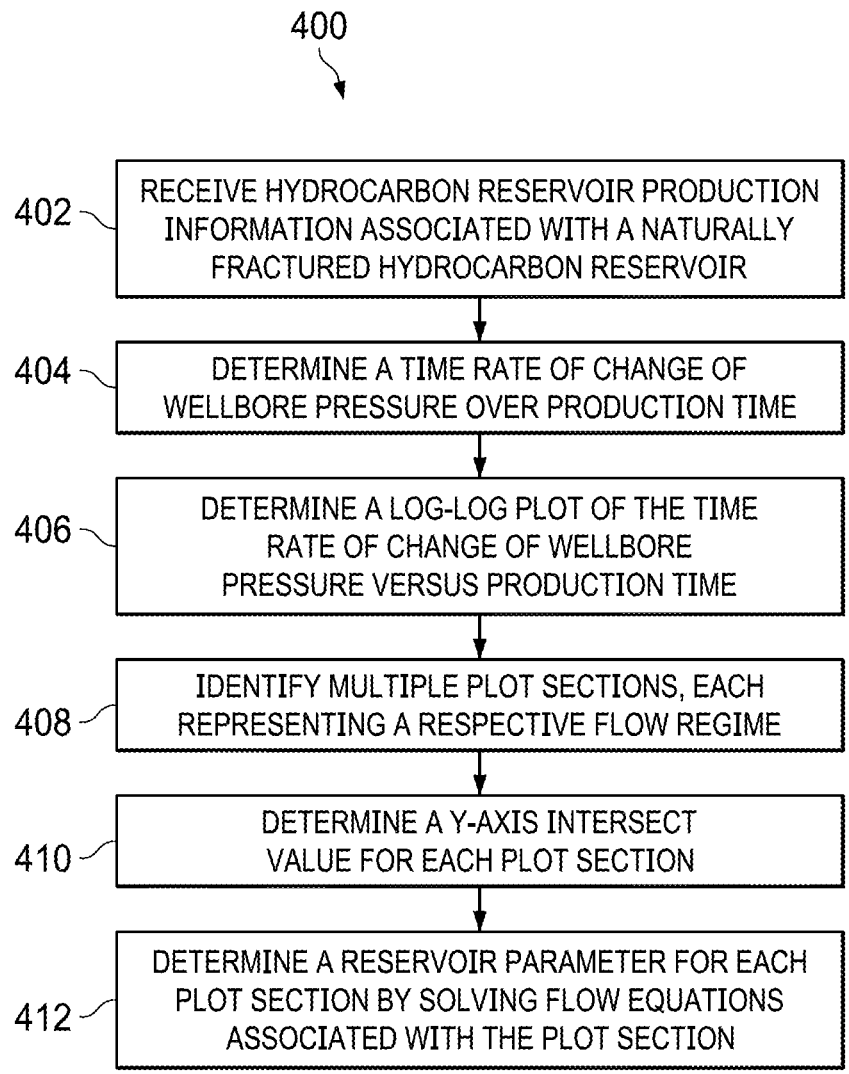
FIG. 4 is a flowchart of an example of a process for determining reservoir parameters of a naturally fractured reservoir with entrapped hydrocarbons.

FIG. 4 is a flowchart of an example of a process 400 for determining reservoir parameters of a naturally fractured reservoir with entrapped hydrocarbons. The process 400 can be implemented using a computer system, for example, the computer system described with reference to FIG. 5.

At 402, hydrocarbon reservoir production information associated with a naturally fractured hydrocarbon reservoir with trapped hydrocarbons is received. A wellbore has been formed in the reservoir to produce hydrocarbons. The information includes a wellbore pressure (p) measured over production time (t).

At 404, a time rate of change of the wellbore pressure over the production time is determined. At 406, a log-log plot of the time rate of change of wellbore pressure versus production time is determined. At 408, multiple plot sections are identified from the log-log plot. Each plot section represents a respective flow regime of a flow of hydrocarbons from the reservoir. At 410, a corresponding time rate of change of the wellbore pressure Y-axis intersect value is determined for each plot section. At 412, a reservoir parameter for each corresponding time rate of change of the wellbore pressure Y-axis intersect value is determined for each plot section.

EXAMPLE

In an example, the information shown in Table 2 was received and provided as an input to the computer system.

TABLE 2

Rock-fluid properties for dual-porosity modeling (all values in S.I. units)

| Parameters | Porosity (I) | Porosity (II) |
|---|---|---|
| Permeability, k (mD) | 0.025 | 2.5 |
| Storage, $\phi C_t$ (1/GPa) | 5.76 | 1.92 |
| Viscosity, μ (cP) | 0.0252 | |
| Gas Volume Factor, B (m³/Sm³) | 0.00452 | |
| Gas Compressibility Factor, Z | 0.93 | |
| Inter-Porosity Flow Coefficient, λ | $6.0 \times 10^{-4}$ | |

For the data shown in Table 2, the wellbore gas potential evolution and gas potential derivative plot during a constant rate of production were determined. The pseudo-linear plot section, the pseudo-radial plot section, and pseudo-steady state plot section having slopes of +½, 0, and +1, respectively, were determined. For each plot section, a corresponding Y-axis intersect value was identified. In particular, for the pseudo-radial plot section (0 slope), the Y-axis intersect value was identified as $y_i$=520 MPa²/cP. Substituting $y_i$ into Equation (30) yielded a fracture permeability of $k^{II}$=2.51×$10^{-15}$ m²=2.51 mD, which is in agreement with the true value of 2.5 mD presented in Table 2. Also, for the pseudo-steady state plot section (+1 slope), the Y-axis intersect value was identified as $y_i$=0.007 Mpa²/cP. Substituting $y_i$ into Equation (32) yielded a matrix permeability of $k^I$=2.4×$10^{-17}$ m²=0.024 mD, which is in agreement with the true value of 0.025 mD presented in Table 2. For the trough, $y_{max}$=160 Mpa²/cP and $y_{min}$=18 MPa²/cP are identified. Substituting $y_{max}$ and $y_{min}$ into Equation (32) yielded a fracture storage of 2.28/GPa, which is close to the true value of 1.92/GPa presented in Table 2. Next, for the pseudo-linear plot section (+½ slope), the Y-axis intersect value was identified as $y_k$=120 Mpa²/cP. Substituting $y_k$ into Equation (33) yielded a hydraulic fracture half-length L=96 m which is also in very good agreement with the true value of 100 m.

Figure 5:
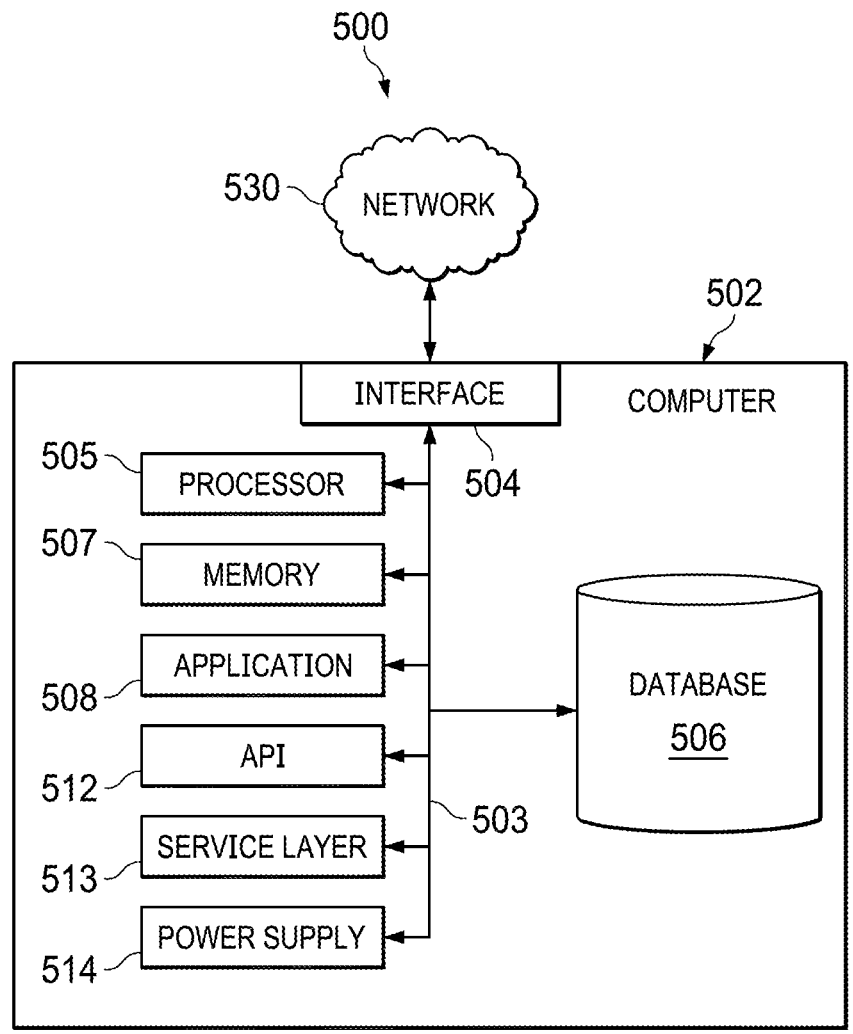
FIG. 5 is a block diagram illustrating an example computer system used to provide computational functionalities associated with described algorithms, methods, functions, processes, flows, and procedures as described in the present disclosure, according to some implementations of the present disclosure.

FIG. 5 is a block diagram illustrating an example computer system used to provide computational functionalities associated with described algorithms, methods, functions, processes, flows, and procedures as described in the present disclosure, according to some implementations of the present disclosure. The illustrated computer 502 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 502 can include input devices such as keypads, keyboards, and touch screens that can accept user information. Also, the computer 502 can include output devices that can convey information associated with the operation of the computer 502. The information can include digital data, visual data, audio information, or a combination of information. The information can be presented in a graphical user interface (UI) (or GUI).

The computer 502 can serve in a role as a client, a network component, a server, a database, a persistency, or components of a computer system for performing the subject matter described in the present disclosure. The illustrated computer 502 is communicably coupled with a network 530. In some implementations, one or more components of the computer 502 can be configured to operate within different environments, including cloud-computing-based environments, local environments, global environments, and combinations of environments.

At a top level, the computer 502 is an electronic computing device operable to receive, transmit, process, store, and manage data and information associated with the described subject matter. According to some implementations, the computer 502 can also include, or be communicably coupled with, an application server, an email server, a web server, a caching server, a streaming data server, or a combination of servers.

The computer 502 can receive requests over network 530 from a client application (for example, executing on another computer 502). The computer 502 can respond to the received requests by processing the received requests using software applications. Requests can also be sent to the computer 502 from internal users (for example, from a command console), external (or third) parties, automated applications, entities, individuals, systems, and computers.

Each of the components of the computer 502 can communicate using a system bus 503. In some implementations, any or all of the components of the computer 502, including hardware or software components, can interface with each other or the interface 504 (or a combination of both) over the system bus 503. Interfaces can use an application programming interface (API) 512, a service layer 513, or a combination of the API 512 and service layer 513. The API 512 can include disclosures for routines, data structures, and object classes. The API 512 can be either computer-language independent or dependent. The API 512 can refer to a complete interface, a single function, or a set of APIs.

The service layer 513 can provide software services to the computer 502 and other components (whether illustrated or not) that are communicably coupled to the computer 502. The functionality of the computer 502 can be accessible for all service consumers using this service layer. Software services, such as those provided by the service layer 513, can provide reusable, defined functionalities through a defined interface. For example, the interface can be software written in JAVA, C++, or a language providing data in extensible markup language (XML) format. While illustrated as an integrated component of the computer 502, in alternative implementations, the API 512 or the service layer 513 can be stand-alone components in relation to other components of the computer 502 and other components communicably coupled to the computer 502. Moreover, any or all parts of the API 512 or the service layer 513 can be implemented as child or sub-modules of another software module, enterprise application, or hardware module without departing from the scope of the present disclosure.

The computer 502 includes an interface 504. Although illustrated as a single interface 504 in FIG. 5, two or more interfaces 504 can be used according to particular needs, desires, or particular implementations of the computer 502 and the described functionality. The interface 504 can be used by the computer 502 for communicating with other systems that are connected to the network 530 (whether illustrated or not) in a distributed environment. Generally, the interface 504 can include, or be implemented using, logic encoded in software or hardware (or a combination of software and hardware) operable to communicate with the network 530. More specifically, the interface 504 can include software supporting one or more communication protocols associated with communications. As such, the network 530 or the interface's hardware can be operable to communicate physical signals within and outside of the illustrated computer 502.

The computer 502 includes a processor 505. Although illustrated as a single processor 505 in FIG. 5, two or more processors 505 can be used according to particular needs, desires, or particular implementations of the computer 502 and the described functionality. Generally, the processor 505 can execute instructions and can manipulate data to perform the operations of the computer 502, including operations using algorithms, methods, functions, processes, flows, and procedures as described in the present disclosure.

The computer 502 also includes a database 506 that can hold data for the computer 502 and other components connected to the network 530 (whether illustrated or not). For example, database 506 can be an in-memory, conventional, or a database storing data consistent with the present disclosure. In some implementations, database 506 can be a combination of two or more different database types (for example, hybrid in-memory and conventional databases) according to particular needs, desires, or particular implementations of the computer 502 and the described functionality. Although illustrated as a single database 506 in FIG. 5, two or more databases (of the same, different, or combination of types) can be used according to particular needs, desires, or particular implementations of the computer 502 and the described functionality. While database 506 is illustrated as an internal component of the computer 502, in alternative implementations, database 506 can be external to the computer 502.

The computer 502 also includes a memory 507 that can hold data for the computer 502 or a combination of components connected to the network 530 (whether illustrated or not). Memory 507 can store any data consistent with the present disclosure. In some implementations, memory 507 can be a combination of two or more different types of memory (for example, a combination of semiconductor and magnetic storage) according to particular needs, desires, or particular implementations of the computer 502 and the described functionality. Although illustrated as a single memory 507 in FIG. 5, two or more memories 507 (of the same, different, or combination of types) can be used according to particular needs, desires, or particular implementations of the computer 502 and the described functionality. While memory 507 is illustrated as an internal component of the computer 502, in alternative implementations, memory 507 can be external to the computer 502.

The application 508 can be an algorithmic software engine providing functionality according to particular needs, desires, or particular implementations of the computer 502 and the described functionality. For example, application 508 can serve as one or more components, modules, or applications. Further, although illustrated as a single application 508, the application 508 can be implemented as multiple applications 508 on the computer 502. In addition, although illustrated as internal to the computer 502, in alternative implementations, the application 508 can be external to the computer 502.

The computer 502 can also include a power supply 514. The power supply 514 can include a rechargeable or non-rechargeable battery that can be configured to be either user- or non-user-replaceable. In some implementations, the power supply 514 can include power-conversion and management circuits, including recharging, standby, and power management functionalities. In some implementations, the power-supply 514 can include a power plug to allow the computer 502 to be plugged into a wall socket or a power source to, for example, power the computer 502 or recharge a rechargeable battery.

There can be any number of computers 502 associated with, or external to, a computer system containing computer 502, with each computer 502 communicating over network 530. Further, the terms "client," "user," and other appropriate terminology can be used interchangeably, as appropriate, without departing from the scope of the present disclosure. Moreover, the present disclosure contemplates that many users can use one computer 502 and one user can use multiple computers 502.

Implementations of the subject matter and the functional operations described in this disclosure can be implemented in digital electronic circuitry, in tangibly embodied computer software or firmware, in computer hardware, including the structures disclosed in this disclosure and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field-programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, such as LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this disclosure can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/−R, DVD-RAM, DVD-ROM, RD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated into, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that the user uses. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch-screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this disclosure can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radial access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this disclosure contains many specific implementation details, these should not be construed as limitations on the scope of what may be claimed, but rather as descriptions of features that may be specific to particular implementations. Certain features that are described in this disclosure in the context of separate implementations can also be implemented in combination or in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

The invention claimed is:

1. A computer-implemented method comprising:
measuring a wellbore pressure (p) in a wellbore over a production time (t) using a pressure gauge;
receiving, by a computer system, hydrocarbon reservoir production information associated with a naturally fractured hydrocarbon reservoir with entrapped hydrocarbons in which the wellbore has been formed to produce the hydrocarbons, the information comprising the wellbore pressure (p) measured over production time (t), production rate ($q_w$), pressure at standard conditions ($p_{sc}$), temperature at standard conditions ($T_{sc}$), thickness of formation in which the wellbore is formed (h), radius of the wellbore ($r_e$), hydrocarbon viscosity (p), reservoir temperature (T), and reservoir porosity and compressibility;
determining, by the computer system, from the wellbore pressure measured over the production time, a time rate of change of the wellbore pressure over the production time;
identifying, by the computer system and from a plot of a logarithmic time rate of change of the wellbore pressure (Y-axis) over logarithmic production time (X-axis), a plurality of plot sections, each plot section representing a respective flow regime of a flow of the hydrocarbons from the reservoir;
determining, by the computer system and for each plot section, a corresponding time rate of change of the wellbore pressure Y-axis intersect value;
determining, by the computer system, a reservoir parameter for each corresponding time rate of change of the wellbore pressure Y-axis intersect value determined for each plot section; and
generating the plot of the time rate of change of the wellbore pressure over the logarithmic production time.

2. The method of claim 1, wherein the plurality of plot sections comprises a pseudo-radial plot section having a slope of substantially 0, wherein determining the time rate of change of the wellbore pressure Y-axis intersect value for the pseudo-radial plot section comprises identifying a Y-axis intersect value ($y_i$) of the pseudo-radial plot section on the plot.

3. The method of claim 2, wherein the reservoir parameter for the pseudo-radial plot section is fracture permeability ($k^H$) of the reservoir, wherein determining the fracture permeability comprises computationally solving the following equation:

$$k^{II} = \frac{q_w T p_{sc}}{2\pi h T_{sc} y_i}.$$

4. The method of claim 1, wherein the plurality of plot sections comprises a pseudo-steady state section having a slope of substantially +1, wherein determining the time rate of change of the wellbore pressure Y-intersect value for the pseudo-steady state plot section comprises identifying a Y-axis intersect value ($y_j$) of the pseudo-steady state plot section on the plot.

5. The method of claim 4, wherein the reservoir parameter for the pseudo-steady state plot section is matrix permeability (e) of the reservoir, wherein determining the matrix permeability comprises computationally solving the following equation:

$$k^I = \frac{y_j \pi h r_e^2 T_{sc} \mu \phi^I C_t^I k^{II}}{4 q_w T p_{sc}},$$

where $\phi^I C_t^I$ is fracture storage.

6. The method of claim 1, wherein the plurality of plot sections comprises a trough in the time rate of change of the wellbore pressure (Y-axis) over logarithmic production time (X-axis), wherein determining the time rate of change of the wellbore pressure Y-intersect value for the trough comprises identifying a Y-axis intersect value of the trough of the plot.

7. The method of claim 6, wherein the trough comprises a high point and a low point, wherein the high point comprises a Y-axis intersect value ($y_{max}$) and the low point comprises a Y-axis intersect value ($y_{min}$), wherein a difference between $y_{max}$ and $y_{min}$ is a time rate of change of pressure of the trough ($\Delta p_{trough}$).

8. The method of claim 7, wherein the reservoir parameter for the trough is fracture storage ($\phi^I C_t^I$), wherein determining the fracture storage comprises computationally solving the following equation:

$$\frac{\Delta p_{trough}}{y_{max}} \approx \frac{\text{Ln}10}{2\pi} \text{Log}_{10} \frac{k^{II} \phi^I C_t^I}{k^I \phi^{II} C_t^{II}},$$

wherein $\phi^{II} C_t^H$ is matrix storage.

9. The method of claim 8, wherein the plurality of plot sections comprises a pseudo-linear section having a slope of substantially +½, wherein determining the time rate of change of the wellbore pressure Y-intersect value for the pseudo-linear plot section comprises identifying a Y-axis intersect value ($y_k$) of the pseudo-linear plot section on the plot.

10. The method of claim 9, wherein the reservoir parameter is hydraulic fracture half length, wherein determining the hydraulic fracture half length comprises computationally solving the following equation:

$$\frac{dm(p)}{dLnt} \to \frac{q_w T p_{sc}}{2hLT_{sc}} \sqrt{\frac{t}{\pi \mu \phi^{II} C_t^{II} k^{II}}},$$

wherein L is the hydraulic fracture half length.

11. The method of claim 1, further comprising computationally solving the following equation:

$$t_D = \frac{\mu}{\pi \lambda} \sqrt{\frac{\phi^I \phi^{II} C_t^I C_t^{II}}{k^I k^{II}}},$$

wherein λ is an inter-porosity flow coefficient.

12. A non-transitory, computer-readable medium storing one or more instructions executable by a computer system to perform operations comprising:
measuring a wellbore pressure (p) in a wellbore over a production time (t) using a pressure gauge;
receiving, by a computer system, hydrocarbon reservoir production information associated with a naturally fractured hydrocarbon reservoir with entrapped hydrocarbons in which a wellbore has been formed to produce the hydrocarbons, the information comprising a wellbore pressure (p) measured over production time (t), production rate (qw), pressure at standard conditions (psc), temperature at standard conditions (Tsc), thickness of formation in which the wellbore is formed (h), radius of the wellbore (re), hydrocarbon viscosity (μ), reservoir temperature (T), and reservoir porosity and compressibility;

determining, by the computer system, from the wellbore pressure measured over the production time, a time rate of change of the wellbore pressure over the production time;

identifying, by the computer system and from a plot of a logarithmic time rate of change of the wellbore pressure (Y-axis) over logarithmic production time (X-axis), a plurality of plot sections, each plot section representing a respective flow regime of a flow of the hydrocarbons from the reservoir;

determining, by the computer system and for each plot section, a corresponding time rate of change of the wellbore pressure Y-axis intersect value;

determining, by the computer system, a reservoir parameter for each corresponding time rate of change of the wellbore pressure Y-axis intersect value determined for each plot section; and generating the plot of the time rate of change of the wellbore pressure over the logarithmic production time.

13. The medium of claim 12, wherein the plurality of plot sections comprises a pseudo-radial plot section having a slope of substantially 0, wherein determining the time rate of change of the wellbore pressure Y-axis intersect value for the pseudo-radial plot section comprises identifying a Y-axis intersect value ($y_i$) of the pseudo-radial plot section on the plot.

14. The medium of claim 13, wherein the reservoir parameter for the pseudo-radial plot section is fracture permeability ($k^{II}$) of the reservoir, wherein determining the fracture permeability comprises computationally solving the following equation:

$$k^{II} = \frac{q_w T p_{sc}}{2\pi h T_{sc} y_i}.$$

15. The medium of claim 14, wherein the plurality of plot sections comprises a pseudo-steady state section having a slope of substantially +1, wherein determining the time rate of change of the wellbore pressure Y-axis intersect value for the pseudo-steady state plot section comprises identifying a Y-axis intersect value ($y_j$) of the pseudo-steady state plot section on the plot.

16. The medium of claim 15, wherein the reservoir parameter for the pseudo-steady state plot section is matrix permeability ($k^I$) of the reservoir, wherein determining the matrix permeability comprises computationally solving the following equation:

$$k^I = \frac{y_j \pi h r_e^2 T_{sc} \mu \phi^I C_t^I k^{II}}{4 q_w T p_{sc}},$$

where $\phi^I C_t^I$ is fracture storage.

17. The medium of claim 16, wherein the plurality of plot sections comprises a trough in the time rate of change of the wellbore pressure (Y-axis) over logarithmic production time (X-axis), wherein determining the time rate of change of the wellbore pressure Y-intersect value for the trough comprises identifying a Y-axis intersect value of the trough of the plot.

18. The medium of claim 17, wherein the trough comprises a high point and a low point, wherein the high point comprises a Y-axis intersect value ($y_{max}$) and the low point comprises a Y-axis intersect value ($y_{min}$), wherein a difference between $y_{max}$ and $y_{min}$ is a time rate of change of pressure of the trough ($\Delta p_{trough}$).

19. The medium of claim 18, wherein the reservoir parameter for the trough is fracture storage ($\phi^I C_t^I$), wherein determining the fracture storage comprises computationally solving the following equation:

$$\frac{\Delta p_{trough}}{y_{max}} \approx \frac{\text{Ln}10}{2\pi} \text{Log}_{10} \frac{k^{II} \phi^I C_t^I}{k^I \phi^{II} C_t^{II}},$$

wherein $\phi^{II} C_t^{II}$ is matrix storage.

20. The medium of claim 19, wherein the operations further comprise computationally solving the following equation:

$$t_D = \frac{\mu}{\pi \lambda} \sqrt{\frac{\phi^I \phi^{II} C_t^I C_t^{II}}{k^I k^{II}}},$$

wherein λ is inter-porosity flow coefficient.

21. The medium of claim 20, wherein the plurality of plot sections comprises a pseudo-linear section having a slope of substantially +½, wherein determining the time rate of change of the wellbore pressure Y-intersect value for the pseudo-linear plot section comprises identifying a Y-axis intersect value ($y_k$) of the pseudo-linear plot section on the plot.

22. The medium of claim 21, wherein the reservoir parameter is hydraulic fracture half length, wherein determining the hydraulic fracture half length comprises computationally solving the following equation:

$$\frac{dm(p)}{dLnt} \to \frac{q_w T p_{sc}}{2hLT_{sc}} \sqrt{\frac{t}{\pi \mu \phi^{II} C_t^{II} k^{II}}},$$

wherein L is the hydraulic fracture half length.

* * * * *

UNITED STATES PATENT AND TRADEMARK OFFICE
CERTIFICATE OF CORRECTION

PATENT NO. : 11,719,091 B2
APPLICATION NO. : 17/550832
DATED : August 8, 2023
INVENTOR(S) : Chao Liu and Younane N. Abousleiman Page 1 of 1

It is certified that error appears in the above-identified patent and that said Letters Patent is hereby corrected as shown below:

In the Claims

In Column 19, Line 16, Claim 1, please replace "(p)," with -- ($\mu$), --.

In Column 19, Line 47, Claim 3, please replace "($k^H$)" with -- ($k^{II}$) --.

In Column 19, Line 65, Claim 5, please replace "(e)" with -- ($k^I$) --.

In Column 20, Line 29, Claim 8, please replace ""$\phi^{II} C_t^H$" with -- "$\phi^{II} C_t^{II}$ --.

In Column 21, Line 37, Claim 14, please replace "($k^\mu$)" with -- ($k^{II}$) --.

Signed and Sealed this
Sixth Day of February, 2024

Katherine Kelly Vidal
*Director of the United States Patent and Trademark Office*